United States Patent
Jansen et al.

(10) Patent No.: US 10,974,292 B2
(45) Date of Patent: Apr. 13, 2021

(54) DEVICE FOR REMOVING CATALYST AND OTHER MATERIAL FROM REFINERY AND PETROCHEMICAL REACTORS AND OTHER VESSELS

(71) Applicant: WorleyParsons Services Pty Ltd, North Sydney (AU)

(72) Inventors: Christopher Jansen, Camp Hill (AU); Merlin S. Hoiseth, Alvin, TX (US); Nicolas Harvey, Chicoutimi (CA)

(73) Assignee: WorleyParsons Services Pty Ltd, North Sydney (AU)

(*) Notice: Subject to any disclaimer, the term of this patent is extended or adjusted under 35 U.S.C. 154(b) by 147 days.

(21) Appl. No.: 16/302,421

(22) PCT Filed: May 18, 2017

(86) PCT No.: PCT/US2017/033240
§ 371 (c)(1),
(2) Date: Nov. 16, 2018

(87) PCT Pub. No.: WO2017/201232
PCT Pub. Date: Nov. 23, 2017

(65) Prior Publication Data
US 2019/0201947 A1    Jul. 4, 2019

Related U.S. Application Data

(60) Provisional application No. 62/338,155, filed on May 18, 2016.

(51) Int. Cl.
*B08B 9/087* (2006.01)
*B01J 8/00* (2006.01)
*B08B 5/04* (2006.01)

(52) U.S. Cl.
CPC ............... *B08B 9/087* (2013.01); *B01J 8/002* (2013.01); *B01J 8/0015* (2013.01); *B01J 8/0025* (2013.01);
(Continued)

(58) Field of Classification Search
CPC ........ B08B 9/087; E02F 3/9268; E02F 3/885; B01J 8/0015; B01J 8/002; B01J 8/0025
See application file for complete search history.

(56) References Cited

U.S. PATENT DOCUMENTS 2,905,506 A * 9/1959 Kristensen ............. B65G 65/22
406/56
3,224,407 A   12/1965 Bertrand
(Continued)

FOREIGN PATENT DOCUMENTS

DE          259749 C      5/1913
DE     102007047553    *  4/2009 ............ B63H 19/08
(Continued)

OTHER PUBLICATIONS

DE102007047553 English Translation, accessed on May 2020. (Year: 2009).*
(Continued)

*Primary Examiner* — Timothy P. Kelly
(74) *Attorney, Agent, or Firm* — Osha Bergman Watanabe & Burton LLP

(57) ABSTRACT

Methods and apparatus are disclosed for removing catalyst, absorbents and other materials from a reactor, guard bed, or other refinery or petrochemical vessel via a robotic or remotely operated device. A vacuum hose is connected to the device for removing the material from the vessel for ex-situ regeneration or disposal. The device moves around on the surface of the catalyst using motorized screws that grip to the catalyst material. The device is powered by hydraulic,
(Continued)

pneumatic or electric motors attached to the frame of the device with supply and return hoses extending in and out of the vessel in line with the vacuum hose.

33 Claims, 20 Drawing Sheets

(52) U.S. Cl.
CPC .............. *B01J 8/0035* (2013.01); *B08B 5/04* (2013.01); *B01J 2208/00761* (2013.01); *B01J 2208/00769* (2013.01)

(56) References Cited

U.S. PATENT DOCUMENTS

| | | | |
|---|---|---|---|
| 3,333,563 | A | 8/1967 | De Bakker |
| 4,338,043 | A | 7/1982 | Biancale et al. |
| 4,476,948 | A | 10/1984 | Komoto et al. |
| 2002/0104580 | A1 | 8/2002 | Fry |
| 2004/0134518 | A1 | 7/2004 | Kraus et al. |
| 2005/0172522 | A1 | 8/2005 | Smith et al. |
| 2006/0054189 | A1 | 3/2006 | Luke et al. |
| 2010/0034599 | A1 | 2/2010 | Snowdon |
| 2011/0315164 | A1 | 12/2011 | DesOrmeaux |
| 2014/0261888 | A1 | 9/2014 | Helmsderfer et al. |
| 2016/0375418 | A1 | 12/2016 | Darcissac et al. |

FOREIGN PATENT DOCUMENTS

| | | |
|---|---|---|
| DE | 102007047553 A1 | 4/2009 |
| JP | S49-048203 B1 | 12/1974 |
| JP | S55-065630 A | 5/1980 |
| JP | S58-033651 A | 2/1983 |
| JP | S59-186786 A | 10/1984 |
| JP | S61-185330 A | 8/1986 |
| JP | H02-310101 A | 12/1990 |

OTHER PUBLICATIONS

International Search Report issued in PCT/US2017/033240 dated Jul. 19, 2017 (3 pages).
Written Opinion of the International Searching Authority issued in PCT/US2017/033240 dated Jul. 19, 2017 (6 pages).
Office Action issued in corresponding GCC Application No. GC 2017-33412, dated Nov. 4, 2020 (5 pages).
Office Action issued in corresponding Japanese Application No. 2019-512949, dated Sep. 8, 2020 (25 pages).

\* cited by examiner

DEVICE FOR REMOVING CATALYST AND OTHER MATERIAL FROM REFINERY AND PETROCHEMICAL REACTORS AND OTHER VESSELS

BACKGROUND

Catalytic reactors and absorbent dryers are used throughout the oil refining and petrochemical industry primarily to alter the chemistry of hydrocarbon products or to remove particulates. The liquid or gas flows through a catalyst bed which brings about a reaction in the fluid components. Over time the catalyst will become deactivated due to the build-up of coke and other phenomena, which steadily causes a reduction in reaction efficiency. The catalyst needs to be removed for regeneration or replacement which, depending on the service, might be as often as twice per year but typically lines up with scheduled equipment turnarounds every four to five years.

Many reactors require inert conditions throughout the catalyst unloading process due to the risks associated with pyrophoric scale. This refers to finely-divided metal sulphides and reduced metals that oxidize spontaneously in air and can combust leading to fire. Inert conditions are achieved via a constant nitrogen purge through the vessel.

The conventional practice within the industry is to unload catalyst containing hazardous materials in a nitrogen atmosphere using specialty catalyst contractors that are equipped with dedicated fresh air systems. Most catalyst change-outs will require multiple people to be within the reactor using breathing apparatus with at least one person directing the end of a large vacuum hose and the other breaking apart agglomerated sections. The catalyst vacuuming process is a dangerous activity, having led to a number of fatalities resulting from asphyxiation, exposure to heat and falling from heights. If the amount of time that people spend inside the vessel during catalyst change-out can be reduced significantly then the probability of death or injury will also reduce significantly.

An alternative approach to inert entry vacuum unloading is full reactor water flooding however this has a number of drawbacks. The main advantage of water flooding is that it provides an alternative to inert entry. The main disadvantages are that it prevents re-use of the catalyst, adds time to the unloading process and adds significant costs associated with contaminated water handling.

SUMMARY OF THE DISCLOSURE

Embodiments disclosed herein provide for devices, systems, and processes that minimize personnel entry in a confined space and/or in an inert atmosphere during the catalyst unloading process. If the amount of time that people spend inside the vessel during catalyst change-out can be reduced significantly, then the probability of death or injury will also reduce significantly. Another purpose of the device is to improve efficiency of the catalyst unloading process by reducing the amount of time for a catalyst change-out. Embodiments of the method and apparatus will remove the need for confined space entry during vacuuming of the bulk catalyst and support material from a fixed bed reactor, guard bed, dryer or other vessel containing catalyst or waste material. The design is adaptable to a range of vessel types and configurations.

In one aspect, embodiments disclosed herein relate to a device for removing solids, such as adsorbents or catalyst, from a vessel. The device may include a frame structure including: a first end member and a second end member, and one or more frame members connecting the first end member to the second end member. A first motor and a second motor are each connected to an end member. A first rotatable screw, connected at a first end to one of the end members via an end bearing and operably connected at a second end to the first motor, and a second rotatable screw, connected at a first end to one of the end members via an end bearing and operably connected at a second end to the second motor, may provide for propulsion and turning of the device. A vacuum head is connected to the frame structure on or proximate the first end plate, the vacuum head having a suction end and a discharge end connectable to a vacuum hose.

In another aspect, embodiments disclosed herein relate to a system for removing solids from a vessel. The system may include the above-described device for removing solids, a vacuum unit connected to the discharge end of the vacuum head via a vacuum hose, and a power unit coupled to the device.

In another aspect, embodiments disclosed herein relate to a method for removing solids from a vessel. The method may include initially locating a system, including the above-described solids removal device, vacuum unit, and power unit, proximate a vessel. The solids removal device may then be disposed within the vessel, and solids may be removed from the vessel by operating the device, the vacuum unit, and the power unit.

Other aspects and advantages will be apparent from the following description and the appended claims.

DETAILED DESCRIPTION

Figure 1:
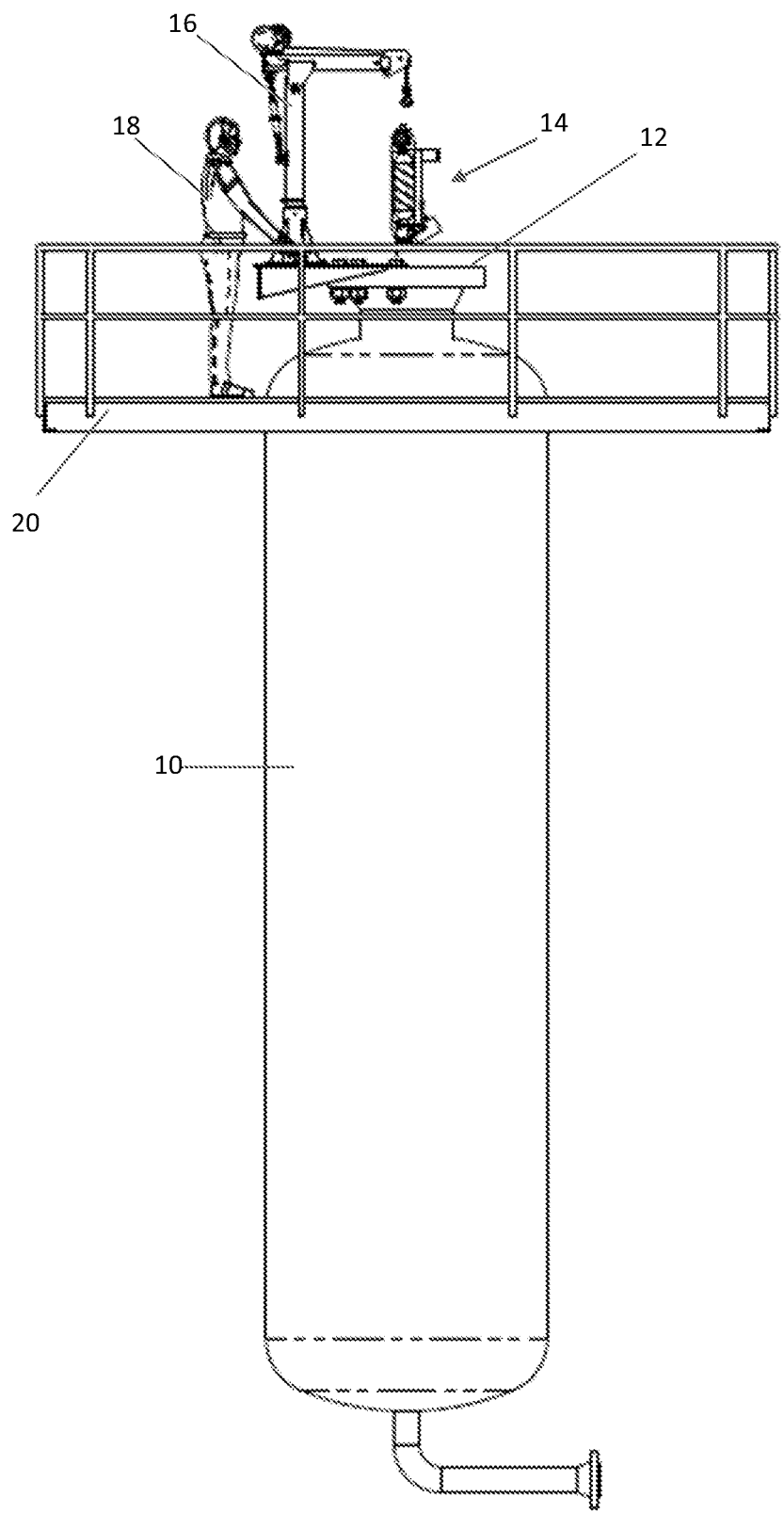
FIGS. 1-3 and FIG. 21 illustrate a jib being used to lower a device for removing solids from a vessel according to embodiments herein into a vessel.

As noted above, embodiments disclosed herein relate to devices, systems, and methods for removing solids, such as adsorbents or catalyst, from a vessel. The solids removal device may be a robotic or remotely controllable apparatus for traversing across and removing solids from a vessel. The device may include elements for support (frame), propulsion and turning (screws and motors), solids removal and solids engagement (vacuum head, breaking apparatus), as well as power unit(s) and controls or control unit(s). Systems for removing solids from vessels may include additional components for disposing or placing a solids removal device within a vessel, operating the solids removal device, and retrieving the solids removal device from the vessel. Each of these are illustrated and described in more detail below.

Frame

The frame structure may include a first end member and a second end member, such as a first end plate and a second end plate. The frame may also include one or more frame members connecting the first end plate to the second end plate. The frame members may be permanently or removably connected to the end plates. The frame may be constructed of various materials, which may be selected based on weight requirements, durability for specific tasks and limitations on conductivity and sparking. For example, a light-weight carbon fiber frame may be used in some embodiments, which may avoid possible aluminum sparking; in other embodiments, an aluminum, metal, metal alloy, ceramic, or plastic frame may be appropriate. The frame may also have an external coating such as a powder or ceramic coating, such as a CERAKOTE coating, to provide higher visibility and/or to reduce wear.

The end members may be any shape or thickness. In some embodiments, the end plates are square or rectangular, and may be of a relatively high aspect ratio when comparing length or height to thickness.

The end plates may include one or more holes, recesses, extensions, or the like for directly or indirectly connecting to various additional portions of the solids removal device. For example, the holes, recesses, extensions, or the like may allow connection of the end plates to the screws and motors, and may provide connection points for the vacuum head, lights, cameras, or detectors that may make up the device.

The frame members connecting the first end plate to the second end plate may be of a fixed length. In some embodiments, the frame members may include the capability to be lengthened or shortened. For example, at least one frame member may be expandable and contractible to selectively vary a distance between the first end plate and the second end plate. For example, the frame member may include an extendable, telescopic, or expandable member, or a foldable or bendable member. The extendable and contractible frame members may include different pre-set positions, and may be readily adjusted via a bolt and nut connection, or a spring loaded pin, for example.

The frame members may include a central frame member, connecting to a central or middle portion of the first and second end plates. Additional frame members may include one or more plates or rods connecting the first end plate to the second end plate.

As will be discussed further below, motors and a vacuum head may be disposed on (connected to) or proximate the first end plate. The frame structure may also include a platform or connection area for disposal of a counterweight on or proximate the second end plate. The counterweight may counterbalance the weight of motors, vacuum head, and other components that may be disposed on or proximate the first end plate. In some embodiments, the counterweight can be interchanged for varying weight requirements. In other embodiments, a position of the counterweight is remotely adjustable. Remote adjustment of the position of the counterweight may be beneficial for improving the balance of the solids removal device when disposed in the vessel and in operation, or to account for addition weight being imposed on the device as additional vacuum hose length is added.

The frame structure may further include one or more connection points for attaching the solids removal device to a jib or hoist, facilitating ingress and egress of the solids removal device from a vessel.

Propulsion and Steering

The solids removal device may be propelled and steered via operation of two screws, including a first rotatable screw and a second rotatable screw, rotated by a first motor and a second motor, respectively. The first and second motors may each be connected to the first plate. The first rotatable screw may be connected at a first end to the second end plate via an end bearing and operably connected at a second end to the first motor. The second rotatable screw may be connected at a first end to the second end plate via an end bearing and operably connected at a second end to the second motor;

The screw/motor arrangements are directly fixed to the chassis at one end by the motor and the other end by an end bearing. The motors may be mounted in-line with the rotatable screws, one motor for each screw. The motors may be hydraulically driven, or can be driven with other types of motors, such as pneumatic or electric. The motors may alternatively be located on the frame structure of the device, such as above the screw and using a belt or other mechanism to drive the rotation of the screws.

In some embodiments, the screws are removably connected to the end frames and/or motors, such that the screws may be readily interchanged, such as for screw or motor repair. More importantly, the types of solids that may be encountered with the solids removal device may vary in size, weight and level of agglomeration. Interchangeable screws may provide for various types of screws to be fitted to the device, where the screw configuration may be selected depending on the type of solids to be removed. Screw length, pitch, angle, pipe diameter, screw height, and material (spark or non-spark) may be varied or customized to meet the needs of a specific project. For example, a vessel may include multiple layers of catalyst or adsorbent, where the layers may be of disparate size. When removing solids from such a vessel, the ability to quickly and easily change screws so as to readily adapt to the varied solids environments is advantageous. Rather than needing multiple solids removal devices for completion of the project, a single device may be used with readily interchangeable parts to meet the demands of the project. Another example is material that is agglomerated or stuck together. Durable screws with sharp ribs, which may also include spikes, may be used to break up such material. For free flowing material, damage to the catalyst is minimised by using plastic screws with curved ribs. The screws may be constructed by traditional manufacturing techniques such as machining or by using modern techniques such as 3D printing to optimise the design and material for the different applications.

Each screw is driven independently to perform right or left turns and forward or reverse operations. In other words, each of the first and second motors are independently operable, such that, independently, the first motor may rotate the first rotatable screw clockwise or counterclockwise, and the second motor may rotate the second rotatable screw clockwise or counterclockwise, thereby providing propulsion and turning capability.

Both rotatable screws may have the same or different directions of rotation to provide forward propulsion. In some embodiments, the rotatable screws may have different "hand", one is "left hand" and the other one is "right hand", to ensure a straight line displacement. In such an embodiment, the first rotatable screw and the second rotatable screw are configured to rotate in opposite directions when both are providing forward propulsion. In some embodiments, as may be desired based on the type of solid material being removed from the vessel, the "hand" of the rotatable screws can be inverted by interchanging screws from one side to the other.

As noted above, it may be desired to vary a diameter of the rotatable screws, depending upon the solids encountered. The first and second end plates may include multiple connection points or adjustable connection points such that the frame structure is connectable to the different diameter rotatable screws while maintaining at least a portion of the screws below the frame structure. For example, an axial connection 2.5 cm above a bottom of the frame would not be suitable for a screw having a 5 cm diameter (flight peak), thus having multiple connection points or an adjustable connection point (oblong hole versus a circular hole, for example), may allow adjustment of the position of the motor and screw so as to adequately contact the solids to perform propulsion and maneuvering operations. The resulting connection would thus be at a suitable location such that screw flights extend below the frame to provide propulsion and turning capability.

Solids Removal and Solids Engagement

Solids removal from the vessel may be effected by the solids removal device via a vacuum head. For example, a vacuum head may be connected to the frame structure on or proximate the first end plate. The vacuum head may have a suction end or nozzle and a discharge end or nozzle. The discharge nozzle may be connectable to a vacuum hose, for example, such that a large industrial vacuum unit situated outside the vessel may draw solids through the suction nozzle and the vacuum hose to a removed solids container, such as a bag, drum, or tank. The vacuum hose may be connectable to the discharge nozzle, for example, using a camlock fitting. One or more of the vacuum hose connections may include a swivel joint or Ferrari coupling which allows the device to turn, whilst the main vacuum hose can remain fixed in place.

In some embodiments, a position of the vacuum head is adjustable via a mechanical linkage connecting the vacuum head to the frame structure. For example, the vacuum head may be connected to the frame by a mechanical linkage able to raise and lower the vacuum head. The linkage may allow adjustment of the height of the head, with a hydraulic cylinder or an adjustment linkage bar, for example, to have the correct vacuum setup depending on the material to be vacuumed (e.g., the vacuum head may be aligned or adjusted to achieve an optimum nitrogen to solids ratio through the vacuum tube). In some embodiments, controls and linkages may be provided such that a position of the vacuum head is remotely adjustable, such as by an operator located outside the vessel while the solids removal device is disposed within the vessel. In some embodiments, a horizontal position of the vacuum head may also be adjustable. In some embodiments, a position of the vacuum head may be both vertically and horizontally adjustable, and a position of the relative sides (left/right or front/back) of the vacuum head may be independently adjustable. The vacuum head may be adjusted up and down or from side to side, for example, by using a gimbal.

Similar to the rotatable screws, the type of vacuum head to be used may depend upon the type of solids being removed from the vessel. In some embodiments the discharge end and/or the suction end of the vacuum head are detachable. Various types of vacuum heads can be fitted, depending on the material density and form. Also, in some embodiments, the vacuum head can be replaced by a mechanical rotating device designed to break fused catalyst material and promote the material up to the vacuum hose, where the rotating device may be a brush roller, an auger, or another type of mechanical rotating device, for example. Another type of vacuum head includes holes on the vacuum cylinder, which enables air or nitrogen to enter the vacuum despite the end of the vacuum being submerged in the material.

Catalysts and adsorbents used in various industries may also agglomerate or may adhere to inner surfaces of a vessel. The rotatable screws, and their flights, may facilitate breaking apart of agglomerated particles. Such, however, may be insufficient for strongly bonded or highly adhered solids. A breaking device directly or indirectly coupled to the frame structure may facilitate solids removal and solids engagement to address such agglomerated or adhered solid particles. A motor may also be provided for rotating or driving the breaking device.

The solids removal device may include one or more breaking devices, such as a breaking device coupled to the second end plate, a breaking device coupled to the first end plate, or a breaking device coupled to the vacuum head. A breaking device may also be provided along a frame member intermediate to the end plates. The breaking device may be positioned to engage the solids at a level similar to that of the vacuum head or rotatable screws, or may be positioned to engage solids at a level above that of the vacuum head or rotatable screws. In various embodiments, the breaking device may include ripper teeth, sheep foot like rollers, paddles, crushers, a disc harrow, a worm drive, a chipping gun, a nitrogen jet, a hydraulic/pneumatic splitter and drill (drill a hole, inject high pressure air), or combinations thereof. Such devices may be used to break apart agglomerates or may dislodge solids adhered to a wall of the vessel.

Power Unit

The solids removal device may be powered by hydraulic fluid. The hydraulic power unit can be standalone using a diesel powered engine, electrically powered or it can be pneumatic. The power unit provides the power to activate the various components such as propulsion, height adjustment and breaking apparatus. The hydraulic hoses may enter the vessel alongside the vacuum hose and electrical supply lines to the cameras and sensors. The hydraulic hoses and/or electrical wires may be contained within an umbilical such as a nylon sleeve. The umbilical outer jacket may be comprised of SANTOPRENE or another similar material to provide resistance to high temperatures and damage. The hydraulic hoses may be connected to the device and/or the hydraulic power unit using quick change couplers which minimise the risk of hydraulic leaks and allow for quick isolation of the hydraulic power unit in the case of an emergency.

The solids removal device can alternatively be fit with pneumatic motors, in which case nitrogen may be used to power the device. In some embodiments, such as where the first and second motors are pneumatic motors, the pneumatic motors may include an exhaust system configured to discharge gas proximate the suction end of the vacuum head, and may be directed downward in some embodiments, aerating or fluidizing the solids proximate the vacuum head. In this manner, the motor system may facilitate or enhance removal of the solids into the vacuum head, rather than simply discharging gas into the vessel.

Controls

The main controls for the solids removal device may be achieved using CANbus controllers. This controller type can be used, for example, for hydraulic over hydraulic, electric over hydraulic, pneumatic over hydraulic, pneumatic over pneumatic, electric over pneumatic, or electric over electric. A Programmable Logic Controller (PLC) could be used as an alternative.

Additional Equipment

Various additional equipment may be used to enhance the operability, efficiency, and safety of the solids removal device. For example, in some embodiments, a camera mounted directly or indirectly to the frame structure. Alternatively or additionally, a light may be connected directly or indirectly to the frame structure.

Alternatively or additionally, one or more sensors or detectors may be mounted directly or indirectly to the frame structure. For example, positional (radar, sonar, level) sensors or an Inertial Measurement Unit may be provided to indicate the position of the solids removal device or portion thereof relative to a wall of the vessel. Controls may operatively connected to the sensors, providing for steering and or operation guidance. For example, positional sensors may be provided and configured to prevent the solids removal device from running into or impacting a wall or other structure within the vessel, thereby avoiding damage to the vessel. Level and other positional sensors (e.g. vertically mounted sonar survey) may provide for an indication of position relative to solids, allowing the solids removal device to maneuver around the vessel such that the solids are removed in a progressive manner, as opposed to digging only on one side or portion of the vessel. Sensors may also be provided to measure or determine the conditions within the vessel, such as composition of the vapors (breathable, combustible, etc.), temperature, pressure, and other measurable attributes. In this manner, the unit may confirm the X, Y, and Z coordinates of the device from a set pre-determined reference point. This information may then be used to track the location of the device, confirming and keeping a log of where cleaning has been conducted. Sensors and other devices, such as a vertically mounted sonar device may be capable of 360° rotation and may be used to take a continuous "picture" of the vessel surface. In this manner, an operator can ascertain the shape and whether any material is left stuck to the sides of the vessel. This information may also be cross-correlated to an Inertial Measurement Unit or otherwise used such that an image displayed for an operator may represent the internal surface sides of the vessel and the catalyst bed surface, a location of where cleaning has been conducted, any problem areas, and other information that may be pertinent to efficient and effective removal of solids from a vessel.

The lighting, cameras, sensors, and/or detectors may incorporate explosion-protection techniques to meet Hazardous Zone requirements. The device may be statically earthed to the vessel superstructure via the vacuum hose and/or bonding cables where required.

The solids removal device may also include one or more bumpers directly or indirectly coupled to the frame structure. Such bumpers, for example, may be made of softer material than the vessel, aiding in prevention of scarring or other damage to the inside of the vessel by contact with the solids removal device.

Systems for removing solids according to embodiments herein may include a solids removal device, as described above. The system may also include a vacuum unit connected to the discharge end of the vacuum head via a vacuum hose, as well as a power unit coupled to the solids removal device. Each of the power unit and the vacuum unit may be attached to the solids removal device via swivel joints or connections, thereby allowing the solids removal device to move independent of the position of the vacuum hoses, hydraulic hoses, or other components. The vacuum hose, hydraulic connections, and/or electrical connections may also be fed from a reel to allow management of the length and position of the connections.

Depending upon the size and configuration of the vessel from which solids are to be removed, the system may also include a jib or hoist. The jib may be configured to attach to the vessel, raise and lower the device into and out of the vessel, and to support the weight of the vacuum hose. For example, the jib may be fixed to the top flange of a reactor to hoist the solids removal device, hoses, umbilicals and other necessary components. The jib may be equipped with a winch, electrically, hydraulically or manually powered, a hose reel and a cable reel. During solids removal, the weight of the solids removal device, the vacuum hose, or a combination thereof, may be partially supported by the jib. Retrieval of the solids removal device is possible without requiring inert vessel entry. The jib may be connected to the manway flange via an adjustable base plate, compatible with a range of different manway sizes and bolt circle configurations. The device may be designed to fit through all typical manway sizes.

The system may also include a control unit configured to control operation of the solids removal device. In some embodiments, the system may also include a control station for remotely operating the device. In this manner, a person may be remotely located from the vessel while controlling the solids removal device during the solids removal operation. The device is capable of being safely operated by personnel ex-situ to the vessel, for example, with a video camera located on the device, or via computerized tracking of the location of the solids removal device within the vessel, such as by an inertial measurement unit or other devices, linkages, and communications. Infrared video may be used in low visibility environments caused by catalyst or other dust, fogging, or other low visibility conditions. The control station can be located at ground level or may be located proximate the top of the vessel or the manway through which entry is gained. The control station may include joysticks and switches, display screens for status, detector readings and video monitoring and controls for the Power Unit. The control station and hydraulic power unit may be contained within a trailer that may be air conditioned, as may be required for compliance with hazardous area operations and allows for quick mobilization on site.

Automatic operation of the solids removal device without operator control may be available in some embodiments. There are two modes of automatic control. One mode involves a pre-programmed sequence based on input reactor dimensions. The second mode uses sensors to determine the level of the catalyst surface and the device automatically moves towards the higher catalyst elevation thereby ensuring catalyst is removed in a uniform manner. The solids removal device may constantly monitor the vessel atmosphere for temperature, oxygen content, and combustible gases with real time values shown on the display screen.

Embodiments disclosed herein also provide for methods of removing solids, such as adsorbents or catalyst, from a vessel. The processes may include locating a solids removal system, as described above, proximate a vessel. The solids removal device may then be disposed within the vessel. Removing solids from the vessel may be facilitated by operating the device, the vacuum unit, and the power unit. Subsequent to the solids removal operation, the solids removal device may then be withdrawn or removed from the vessel, with the aid of the jib for example.

The solids removal device and operation of the solids removal device are illustrated in FIGS. 1-10.

FIG. 1 shows a typical single bed reactor 10 with a 24-inch open manway 12 at the top. A solids removal device 14 according to embodiments herein is attached to a jib 16 used for lowering the solids removal device 14 into the reactor. The solids removal device 14 is winched down into the reactor 10 to the catalyst surface (not illustrated). The vacuum hose and hydraulic lines are not shown in the drawing. A person 18 is shown on platform 20 outside the vessel to give an idea of scale, however in reality this person would be within the inert atmosphere exclusion zone and would therefore be wearing breathing apparatus.

Figure 2:
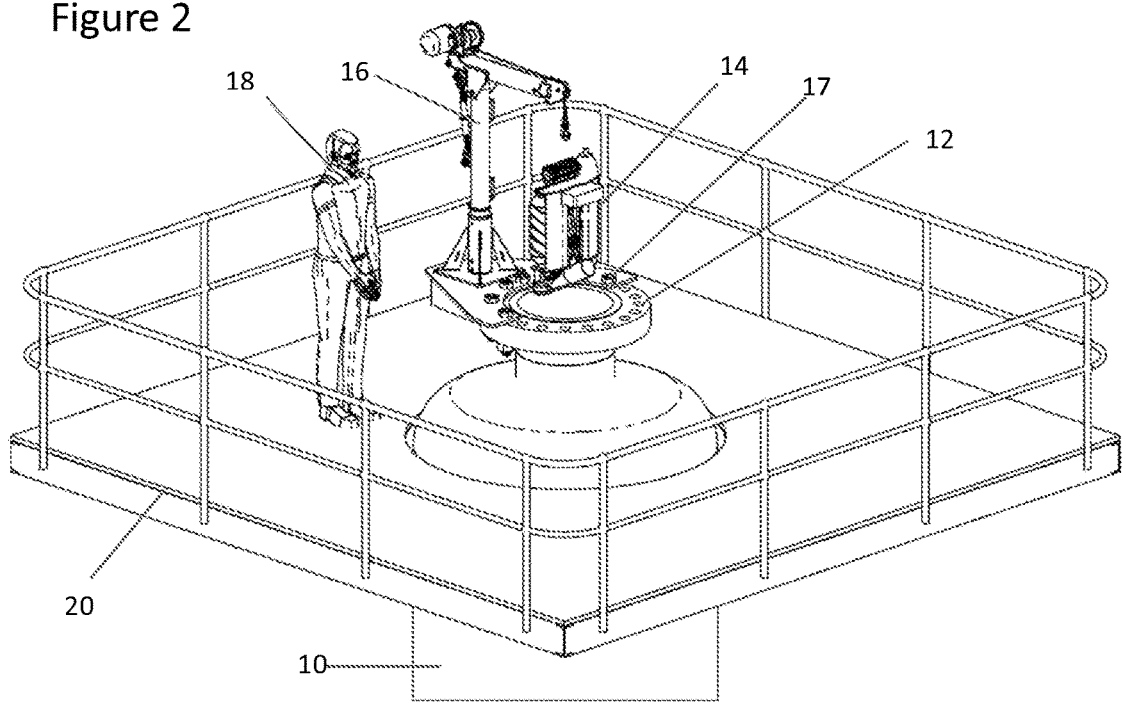

FIG. 2 shows the jib 16 attached to the reactor 10 top manway flange 12 using a number of bolts 17. The jib 16 is used to lower the device into the reactor and to support the weight of the vacuum hose (not shown).

Figure 3:
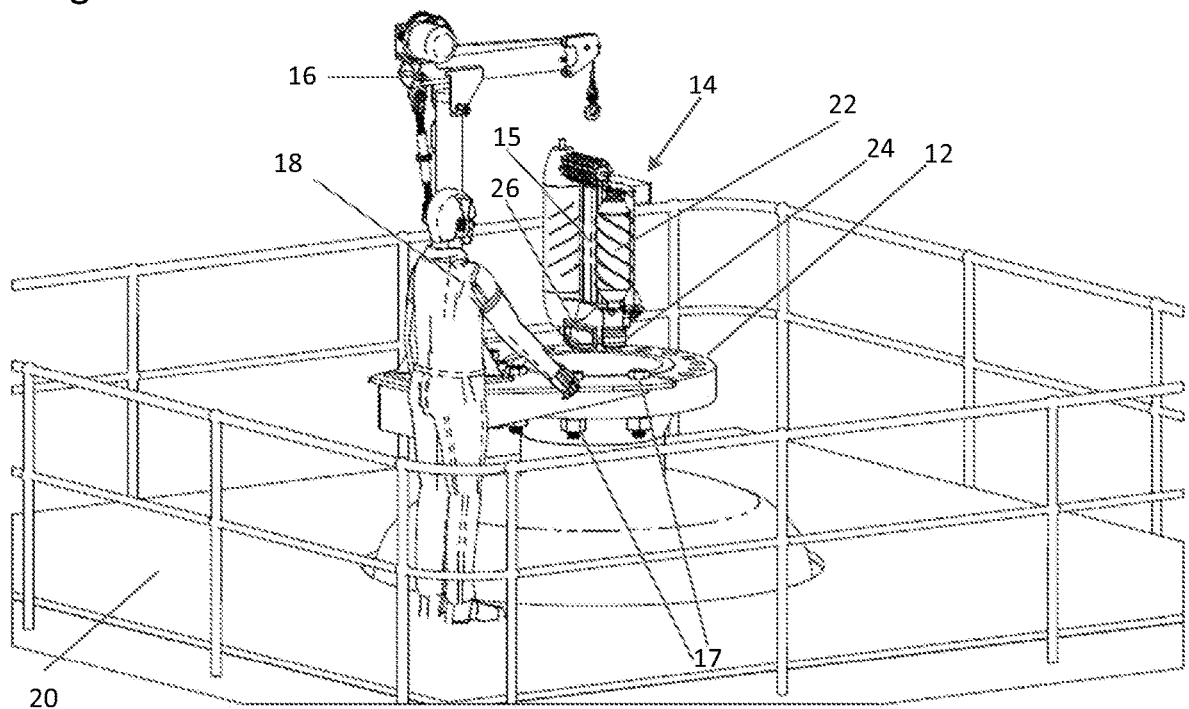

FIG. 3 shows another perspective of the solids removal device, in a vertical position located above the manway opening 12. The bottom 15 of the solids removal device 14 can be seen showing the two screws 22 that rotate to provide propulsion, the hydraulic motors 24 attached to each screw, and the opening of the vacuum head (suction nozzle 26).

Figure 4:
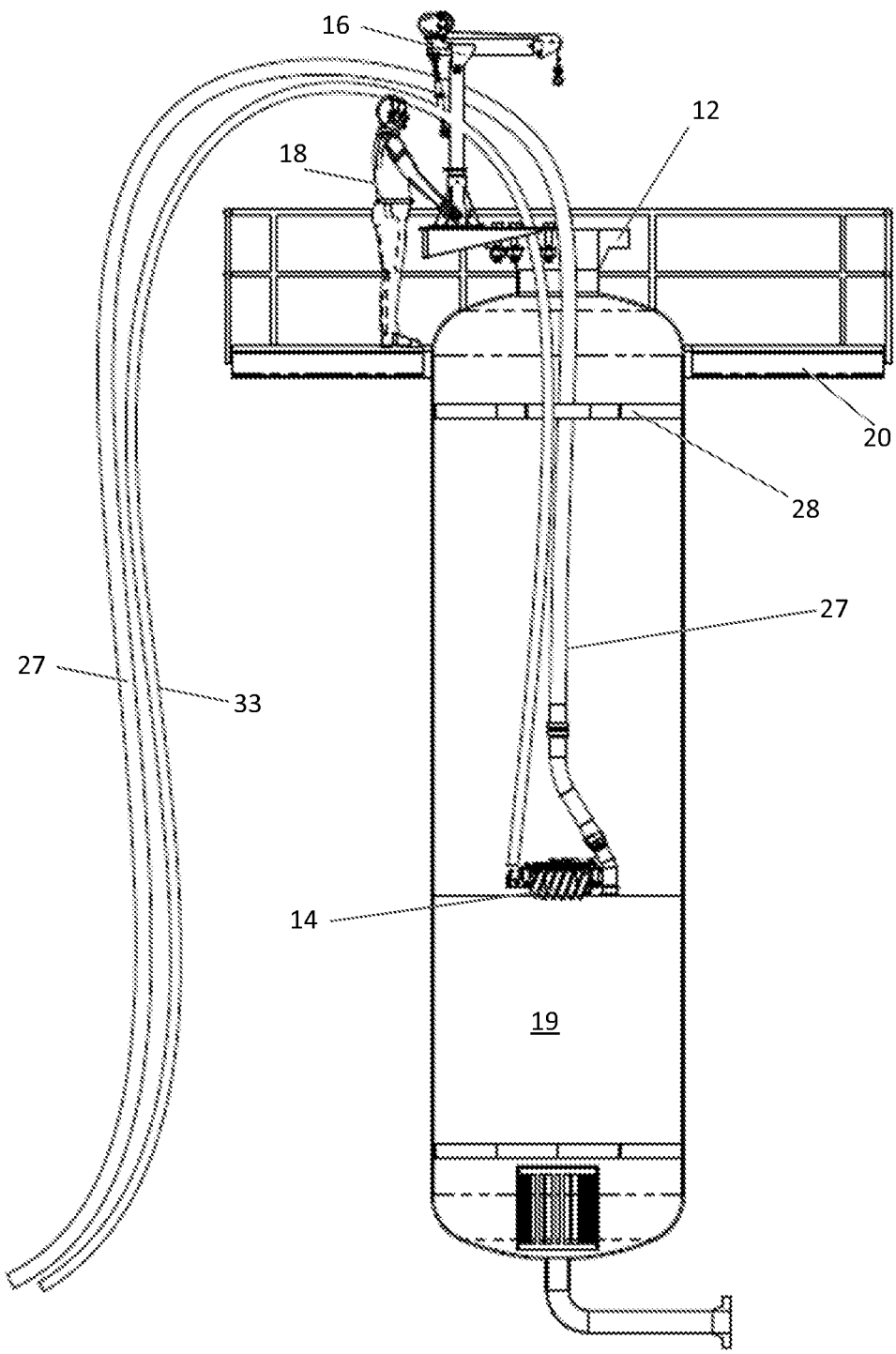
FIGS. 4-10 illustrate devices according to embodiments herein and their use in removing solids from a vessel.

FIG. 4 shows the solids removal device 14 situated in the reactor 10 in the horizontal position on top of a catalyst bed 19. The vacuum hose 27 and hydraulic lines 33 are connected to the solids removal device 14 and continues out through the top manway 12 and down to grade, where an industrial vacuum unit (not shown) will be located. Typical internals for a single bed reactor are also shown. The solids removal device and associated hoses and connections need to fit through the top manway 12 and the internal screen 28 manway, which is removed by other means. The winch cable, among other components, is not shown. The winch cable may remain attached to the solids removal device during operation, such as to aid in righting a flipped device or to minimize "fishing" or personnel entry into the vessel to right a flipped device or to attach a cable for removal of the device from the vessel. In other embodiments, the cable may be disconnected during operation to minimize potential for entanglements with the vacuum hose, hydraulic or electric lines, etc. In yet other embodiments, one or more of the connectors, such as for the vacuum hose, hydraulic lines, electric lines, or control lines may be of sufficient capacity for use in lowering, righting, and/or lifting the solids removal device into, within, and/or from the vessel, respectively.

Figure 5:
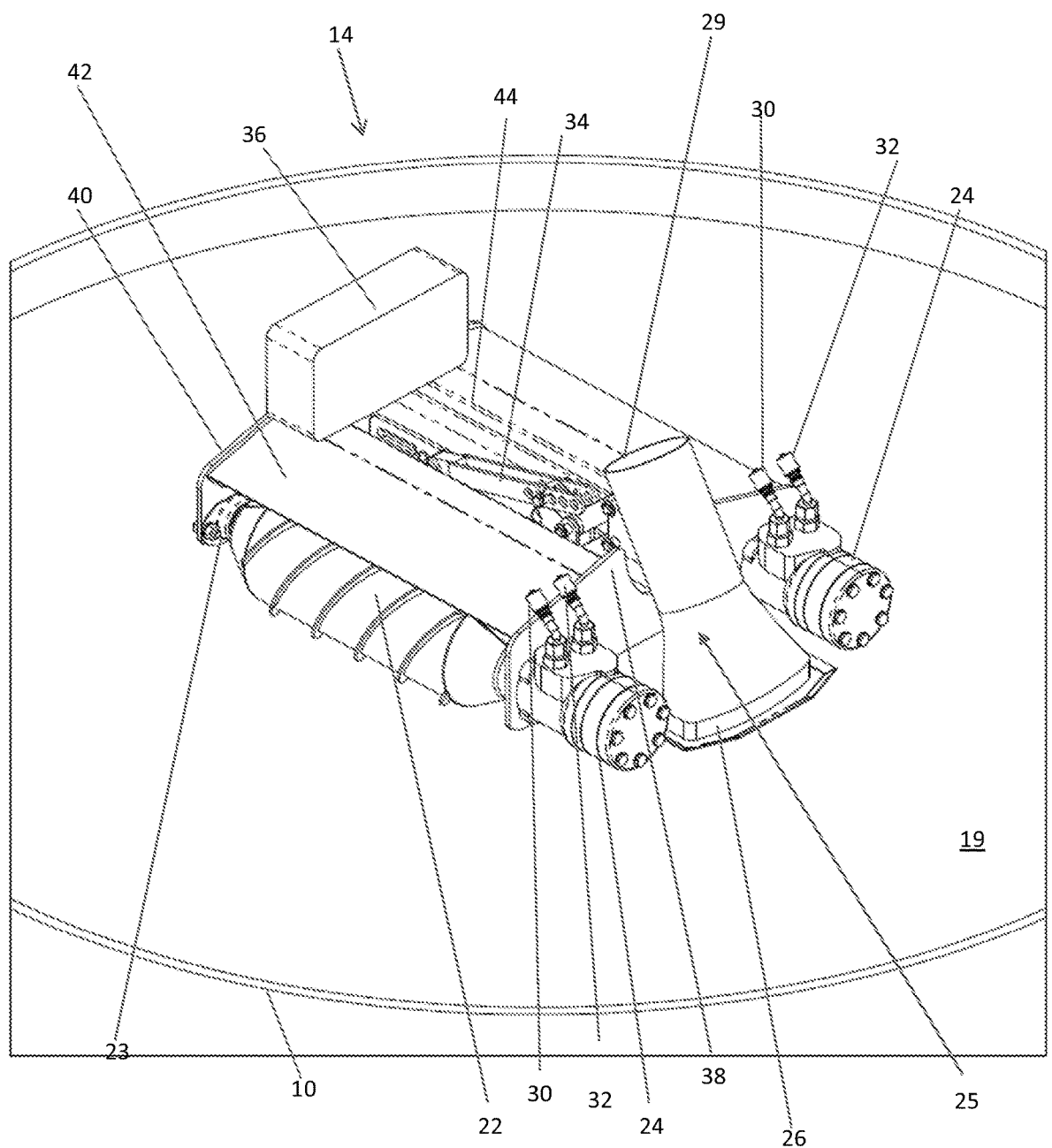

FIG. 5 shows the solids removal device 14 from the side/front view sitting on a horizontal bed of catalyst. One of two rotatable screws 22 is visible, which are each powered by their own hydraulic (or pneumatic) motor 24. The rotatable screws move and the grooves or flights grip to the catalyst/solids thereby creating propulsion. In this embodiment, supply and return hydraulic line connections 30, 32 are shown. The vacuum head 25 is located at the front of the device with the suction nozzle 26 directed down towards the catalyst, and the discharge nozzle 29 pointing upward. A mechanism 34 for adjustment of the vacuum head angle is shown. A counter weight 36 at the back of the solids removal device may be required to balance the weight from the vacuum head 25 and hydraulic motors 24. Also illustrated in FIG. 5 are first and second end plates 38, 40, as well as frame members 42, 44 connecting the first and second plates, end bearing 23 and respective connections for attaching the frame structure to the vacuum head, motors, rotatable screws (not independently labeled).

Figure 6:
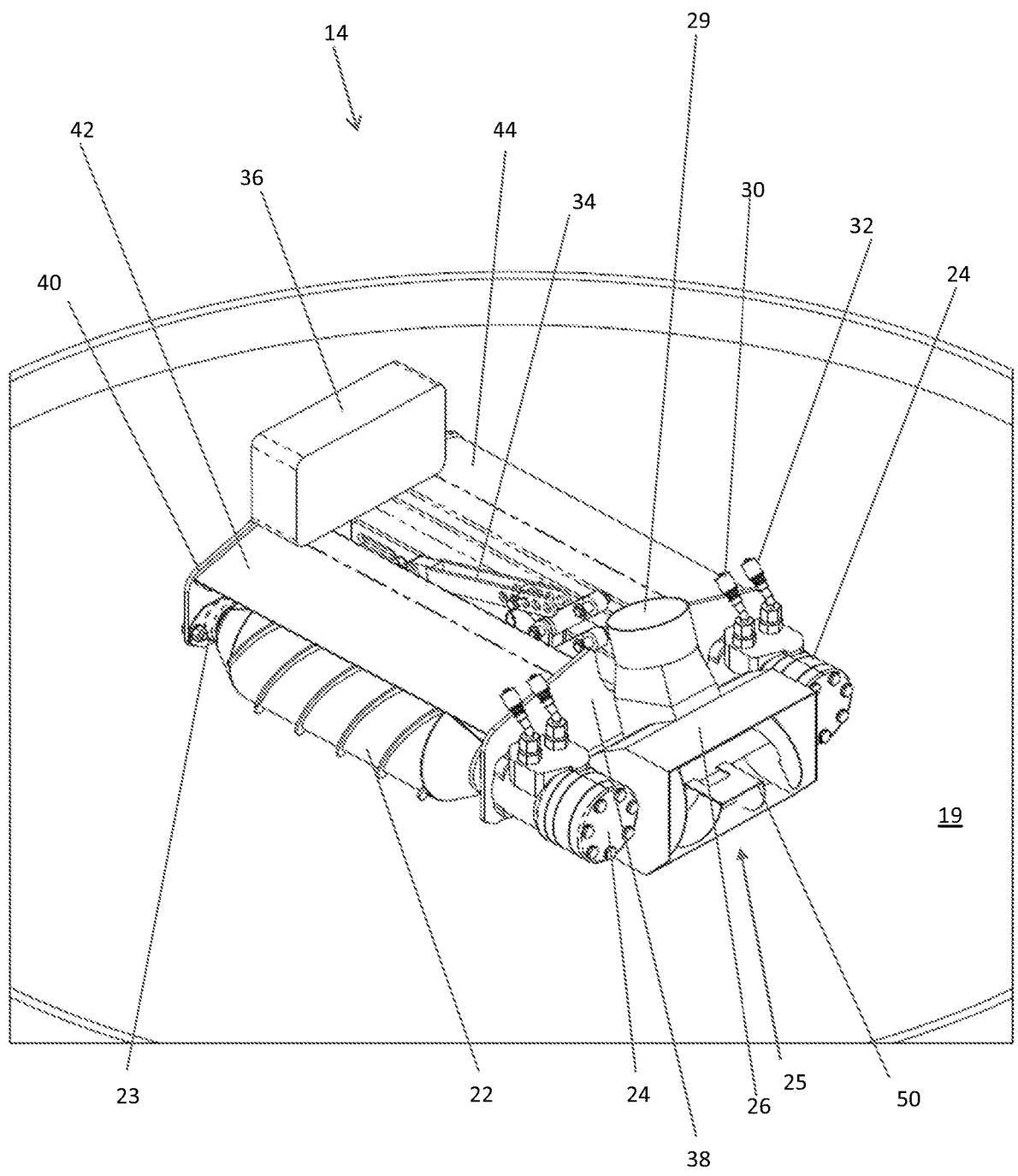

FIG. 6 shows the solids removal device 14 with a different vacuum head 25 attached. The vacuum head 25 in this embodiment incorporates a rotating cutting device 50 for assisting in dislodging catalyst and directing the material up and into the suction and discharge nozzles 26, 29, and thence into the vacuum hose (not illustrated). The rotating blades of rotating cutting device 50 may be powered by another motor (not shown). The alternative vacuum heads may be quickly interchangeable and can be customized for different applications including various shapes and sizes.

Figure 7:
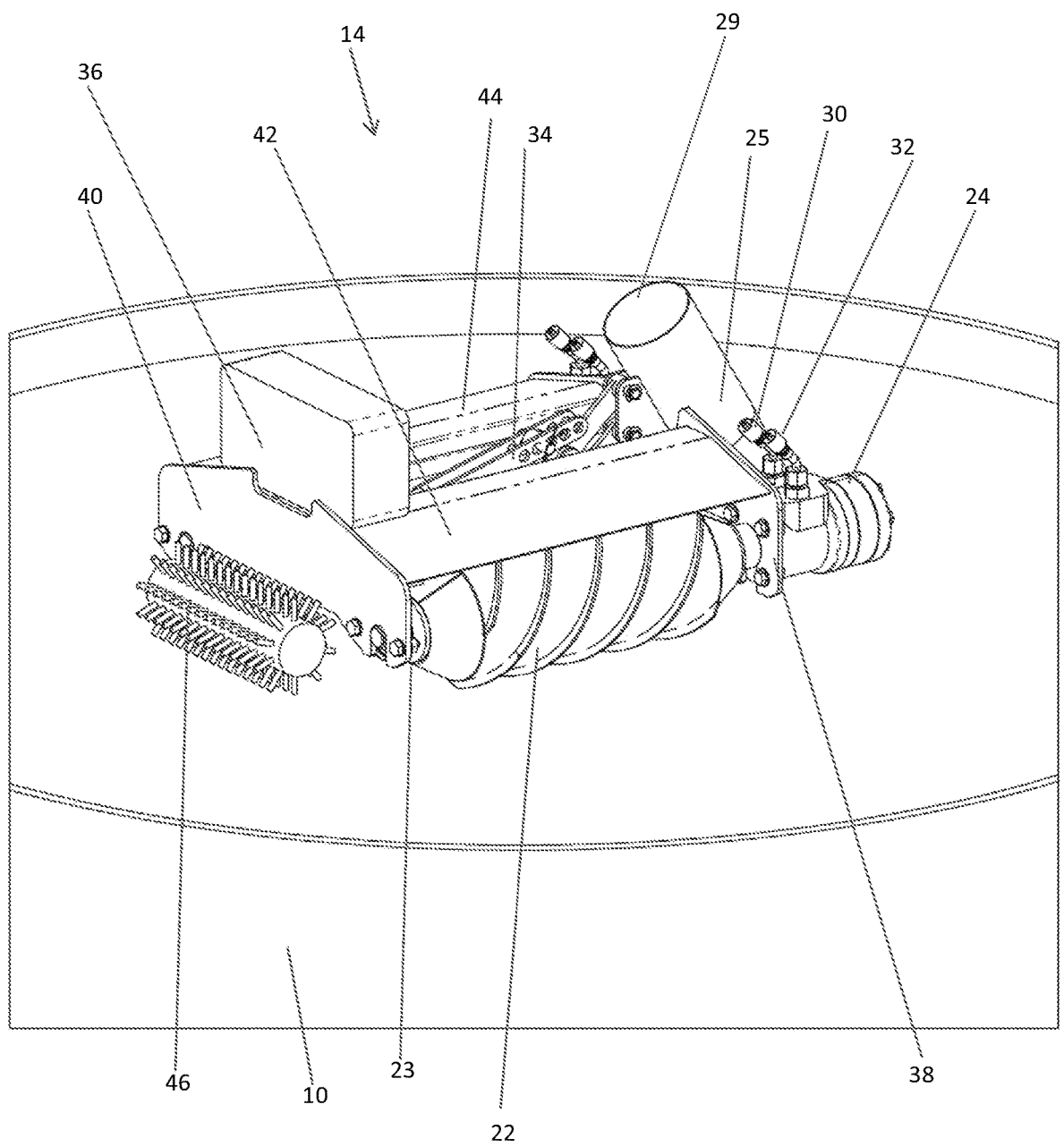

FIG. 7 shows the solids removal device 14 from the side/rear view sitting on a horizontal bed of catalyst. The top of the vacuum head 25 can be seen, discharge nozzle 29, which is where the vacuum hose (not shown) is connected. The sheep foot like roller breaking apparatus 46, located at the rear of the solids removal device 14, may be an optional accessory used to assist in breaking up slightly fused or agglomerated catalyst. The breaking apparatus 46 roller in this embodiment sits on the catalyst surface and turns around via an additional hydraulic motor (not shown) which may use a belt or other drive so that the motor can be located above the roller, for example. In other embodiments, the roller freely spins based on propulsion via rotatable screws 22. In yet other embodiments, a position or height of the breaking apparatus 46 roller may be such that, or adjustable such that, the tips of the breaking apparatus rollers may be used to address solids adhered to a vessel wall above the catalyst surface.

Figure 8:
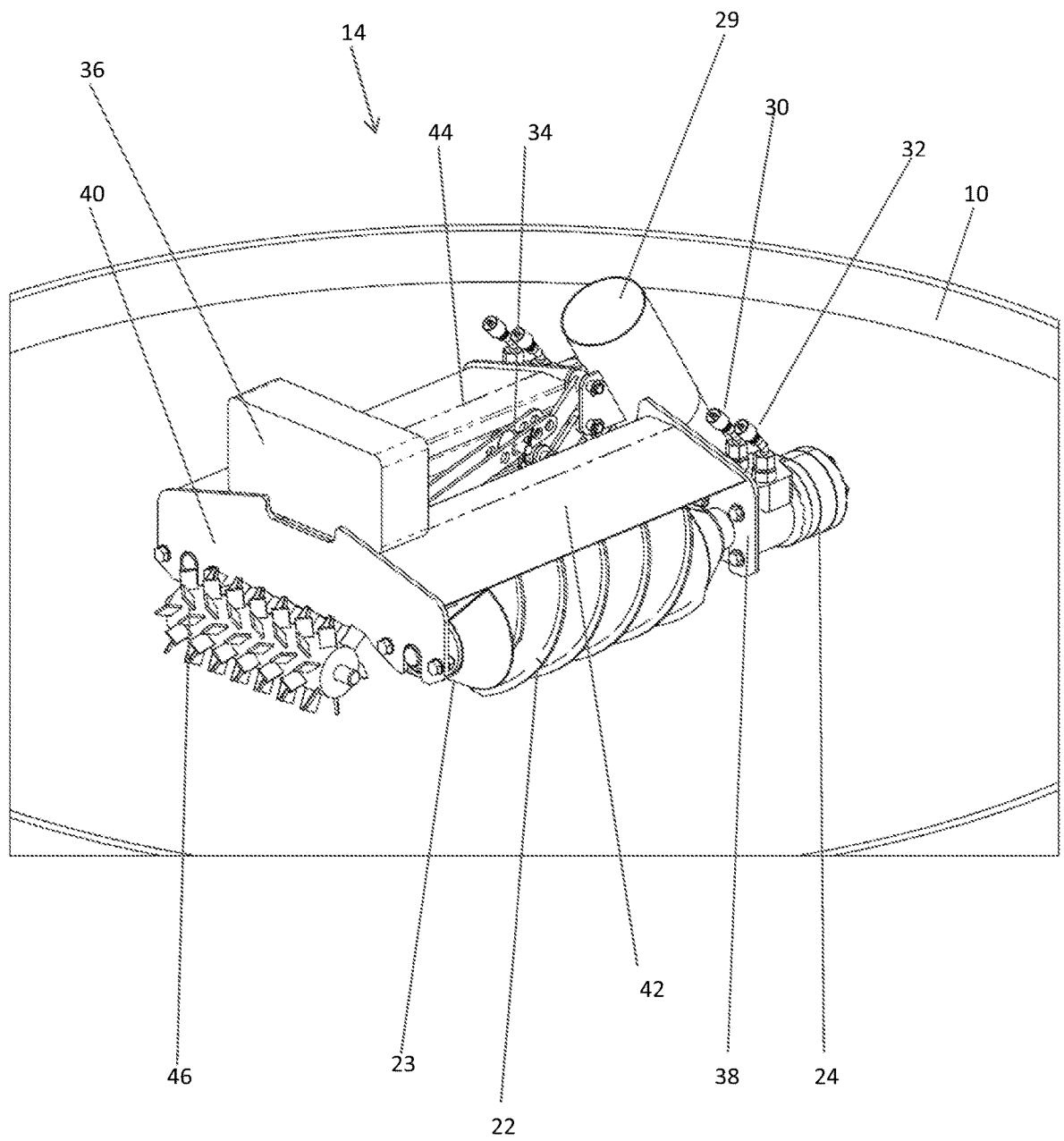

The embodiment of the solids removal device 14 illustrated in FIG. 8 shows another type of breaking apparatus 46 which can be interchanged depending on the catalyst or solid type and condition. As illustrated, the paddle type component may spin to help propel the device as well as to break the surface of the catalyst or solid bed. Also illustrated in FIG. 8 are first and second end plates 38, 40, as well as frame members 42, 44 connecting the first and second plates, and respective connections for attaching the frame structure to the vacuum head, motors, rotatable screws (not independently labeled).

Figure 9:
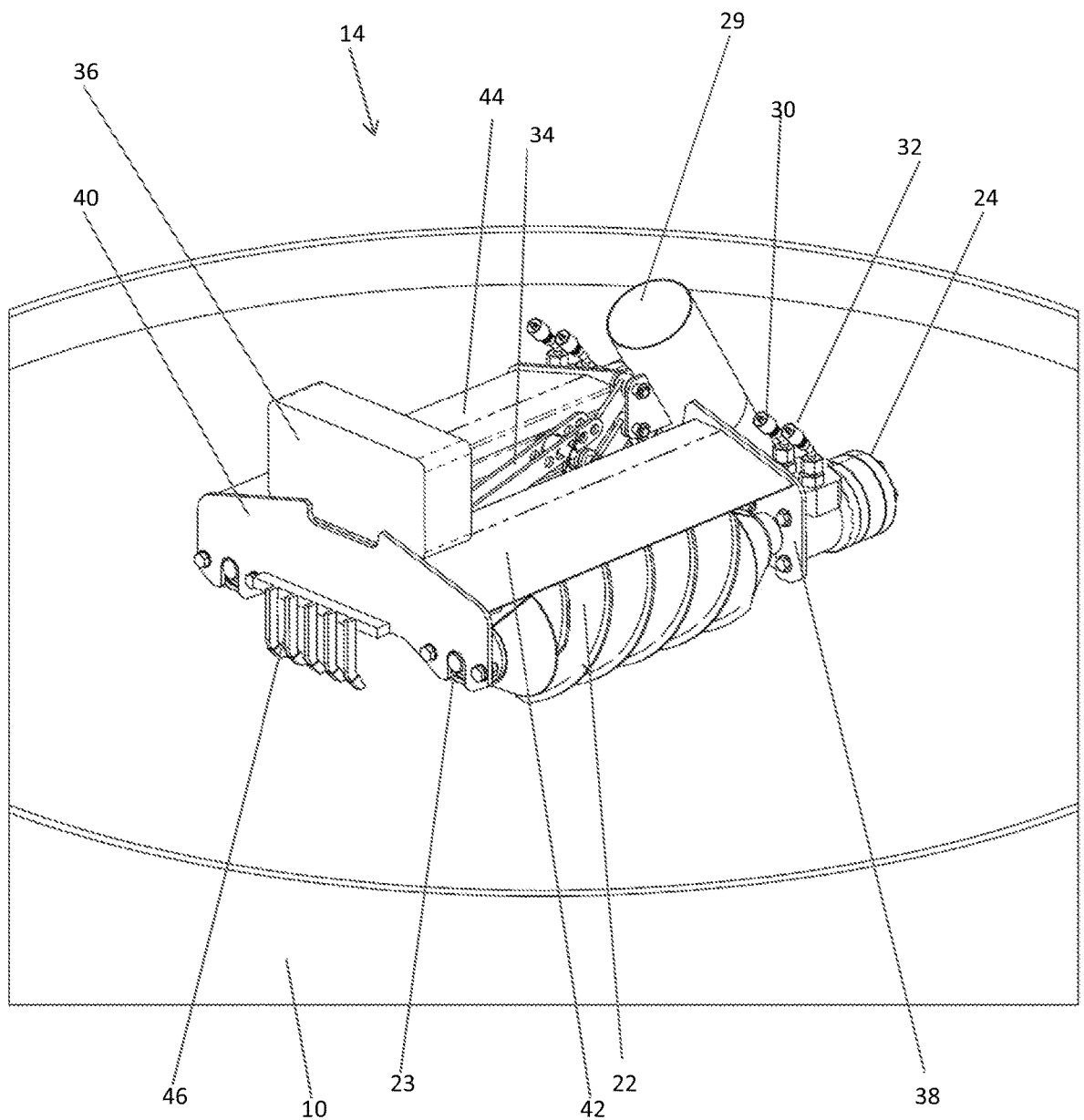

The embodiment of the solids removal device 14 illustrated in FIG. 9 incorporates another type of catalyst breaking apparatus 46 using ripper blades connected to the rear. These ripper blades may provide a mechanical means of breaking apart a layer of catalyst crust on the surface of the catalyst bed.

As noted above, and as illustrated in FIG. 10, the motors 24 may alternatively be located on the frame structure of the solids removal device 14. For example, the motors 24 may be attached to the end plates 38, 40 above the rotatable screws 24 and may use a belt 31 or other mechanism to drive the rotation of the rotatable screws.

Figure 10:
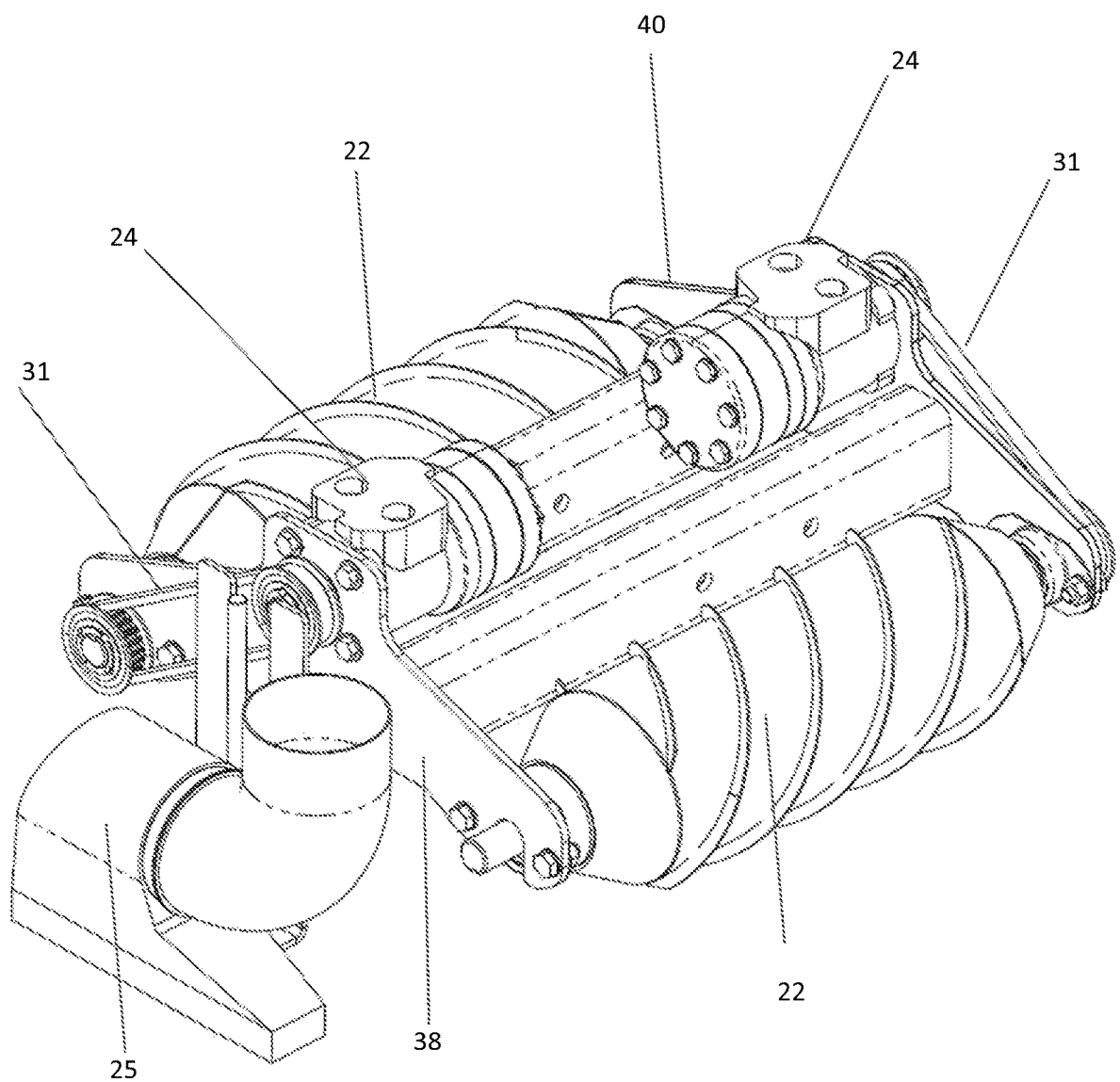

As described with respect to FIG. 5, for example, the motors were disposed on the same end plate. In the embodiment of FIG. 10, the motors are associated with different end plates. The location of the motors may depend upon various aspects, including drive mechanism, size of the end plates, balance requirements, etc. Further, while FIG. 10 illustrates the belt drive being disposed behind the vacuum head 25, the motor and drive may be offset from the vacuum head.

As illustrated and described above, solids removal devices, and systems incorporating such solids removal devices, may be used to facilitate removal of solids, such as catalysts or adsorbents, as well as inert particles or other types of particles, from a vessel, such as a reactor, distillation column, settling bed, guard bed, dryer, or other types of vessels or containers that may use or accumulate solids. Key aspects of the designs disclosed herein may include: (i) Screw propelled, can accept various type of screw (auger pitch/height, diameter, length); (ii) Various vacuum heads can be attached depending on catalyst type with quick interchange; (iii) Vacuum head mechanically or remotely adjustable to optimise gas to catalyst flow in the vacuum; (iv) Hydraulic, pneumatic or electric driven; (v) Direct controls, remote controls or automatic control using pre-set reactor dimensions or sensors; (vi) Vacuum connection: swivel or fix connections; (vii) Controls connection: swivel or fix connections; (viii) Various adaptable breaking devices with quick interchange (sheep foot roller, breaking paddle, ripper, etc.); (ix) Explosion-protection techniques to meet Hazardous Zone requirements for lighting and other electrical components; (x) Infrared or standard camera; (xi) Jib fixed to the top flange of the reactor or tripod above reactor opening to lower and raise the device, hoses and other necessary components; (xii) Jib winch electrically, hydraulically or manually powered; (xiii) Hose reel and cable reel; (xiv) Remote Control Unit including Joystick and switches, display screen for status and video and controls for Power Unit; (xiv) and sensors and controllers to facilitate automatic (robotic) operation of the motors and/or hydraulic cylinders.

Figure 11:
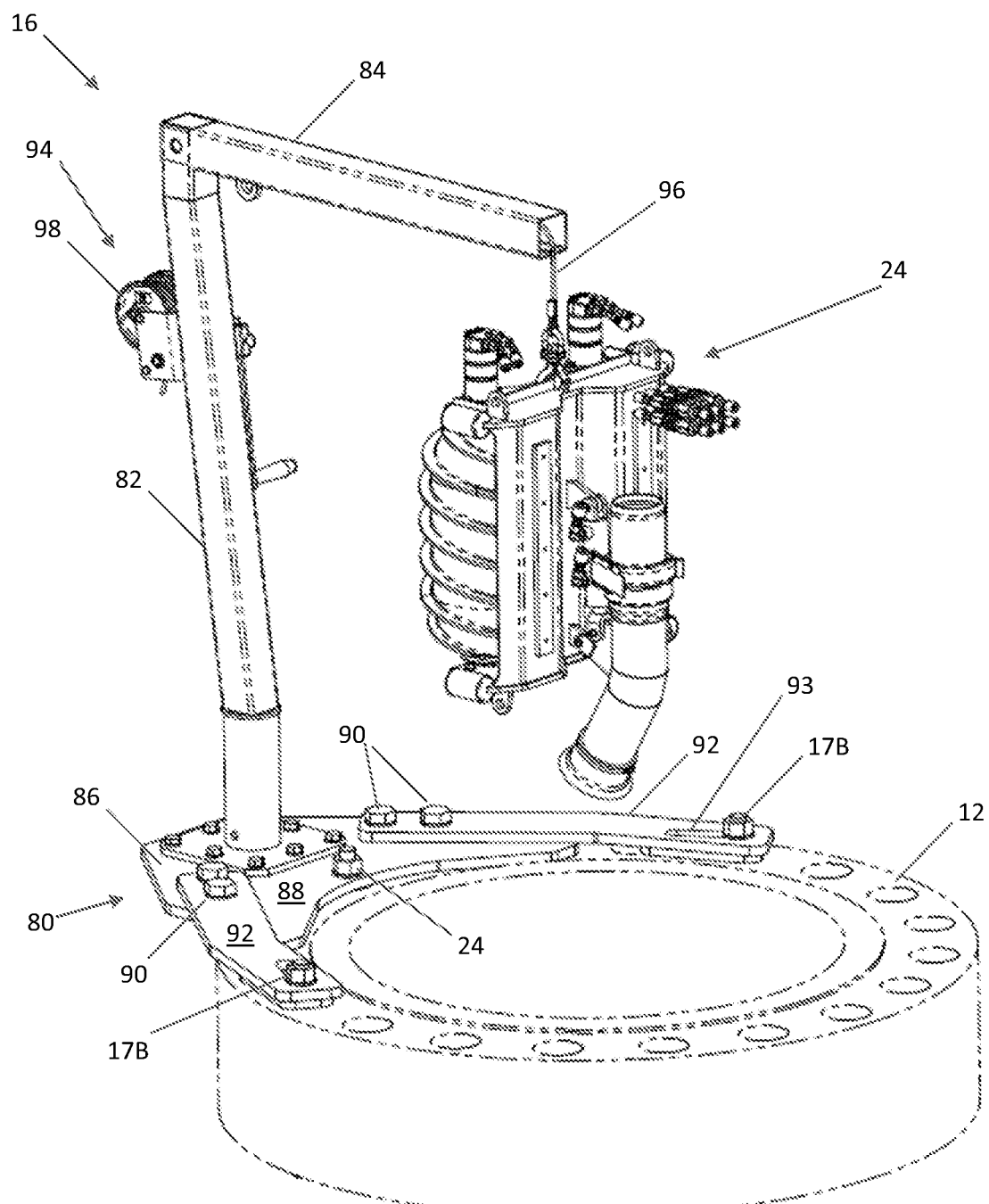
FIG. 11 illustrates a jib-flange connection for use in raising or lowering a device for removing solids from a vessel according to embodiments herein.

FIG. 11 illustrates a jib according to embodiments herein useful for lowering a device for removing solids into a vessel. In some embodiments, the jib may be configured to allow use with a variety of manway sizes. Jib 16, as noted above, may be connected to a manway flange 12 via bolts 17. As illustrated, jib 16 may include a base 80, a vertical arm 82 connected to the base 80, and a horizontal arm 84 connected to vertical arm 82. A height of the vertical arm should be high enough to provide clearance for the solids removal device. A length of the horizontal arm should provide sufficient clearance for lowering the solids removal device into and raising the solids removal device from a vessel; while ideally central to the manway, an offset is permissible so long as sufficient clearance from the sides of the manway is provided. In some embodiments, a height, length, or position of arms 82, 84 may be adjustable.

The jib base 80 may include a primary base plate 86, which may include a rounded front portion 88, which may have a radius of curvature selected so as to be of relevant proportions and provide contact area with a variety of manway flange diameters. The base plate 86 may include a central borehole for attachment of the primary base plate 86 to manway flange 12 via a bolt 17A. Base plate 86 may also include a number of bolt holes 90 patterned to provide connection of a jib flange 92 to manway flange 12 via bolts 17B. Jib flange 92 may also include an oblong hole 93 providing for connection of bolts 17B over a variety of manway flange diameters. In this manner, jib 16 may be connected to flange 12 and may provide adequate support and control for raising and lowering the solids removal device 14 into and out of the vessel.

The jib may also include a jib winch 94, which may be electrically, hydraulically, or manually powered. The jib cable 96 may be spooled on a reel 98, providing the necessary storage and length control to facilitate the lowering and raising of the solids removal device 14. The reel 98 should be sized to hold a sufficient length of cable, so as to reach the bottom of the vessel being cleaned. Likewise, the winch and jib should be sized and configured to handle the weight of the solids removal device and associated cables and hoses, etc., at full extension (e.g., at the bottom of a tall vessel).

Referring now to FIGS. 12-15, other embodiments of a solids removal device are illustrated. Like reference numerals are used for like parts, consistent with the embodiments illustrated in FIGS. 4-10, including: solids removal device 14; hydraulic connections 30/32; motors 24; screws 22; bearings 23; mechanism 34; plates 38/40; and vacuum head 25.

In general vacuum head 25 may be of any desired or useful shape. As illustrated in FIGS. 12-15, vacuum head 25 may be round. Vacuum head 25 may also include adjustable ports 100, used to adjust a suction of the vacuum head 25 and to allow for the end 102 of the vacuum to be fully immersed into the catalyst without losing suction. The size of the ports may be controlled, for example, via two concentric pipes, where rotation of the outer pipe may alter a size of the ports, allowing or restricting flow of gases through the port, and thereby controlling a suction through the bottom 102 of vacuum head 25. In other embodiments, suction control ports 100 may be located elsewhere on vacuum head 25. The suction control mechanism may be manually or remotely adjustable.

Vacuum head 25 may also include a swivel connection 105. Swivel connection 105 may provide for freedom of movement of the solids removal device. The vacuum hose (not illustrated), extends from the solids removal device to the top of the vessel and thence to a collection device. The vacuum hose may thus be cumbersome and may hinder the movement ability of the solids removal device. Use of a swivel connection 105 or other types of connections that provide for freedom of movement may increase the efficiency and ease of operation of the solids removal device.

Figure 12:
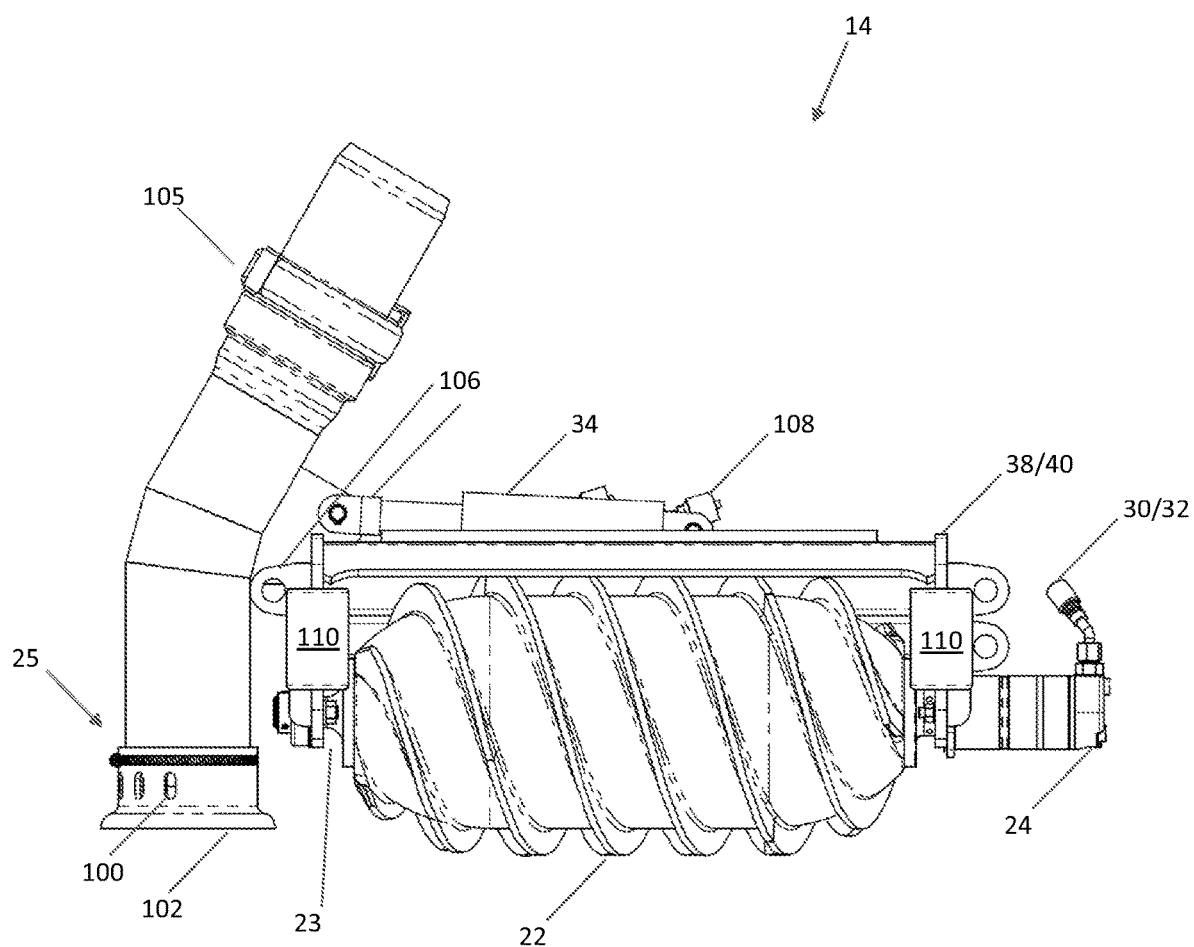
FIGS. 12-20 and FIGS. 22 and 23 illustrate vacuum devices for removing solids from a vessel according to embodiments herein.
Figure 13:
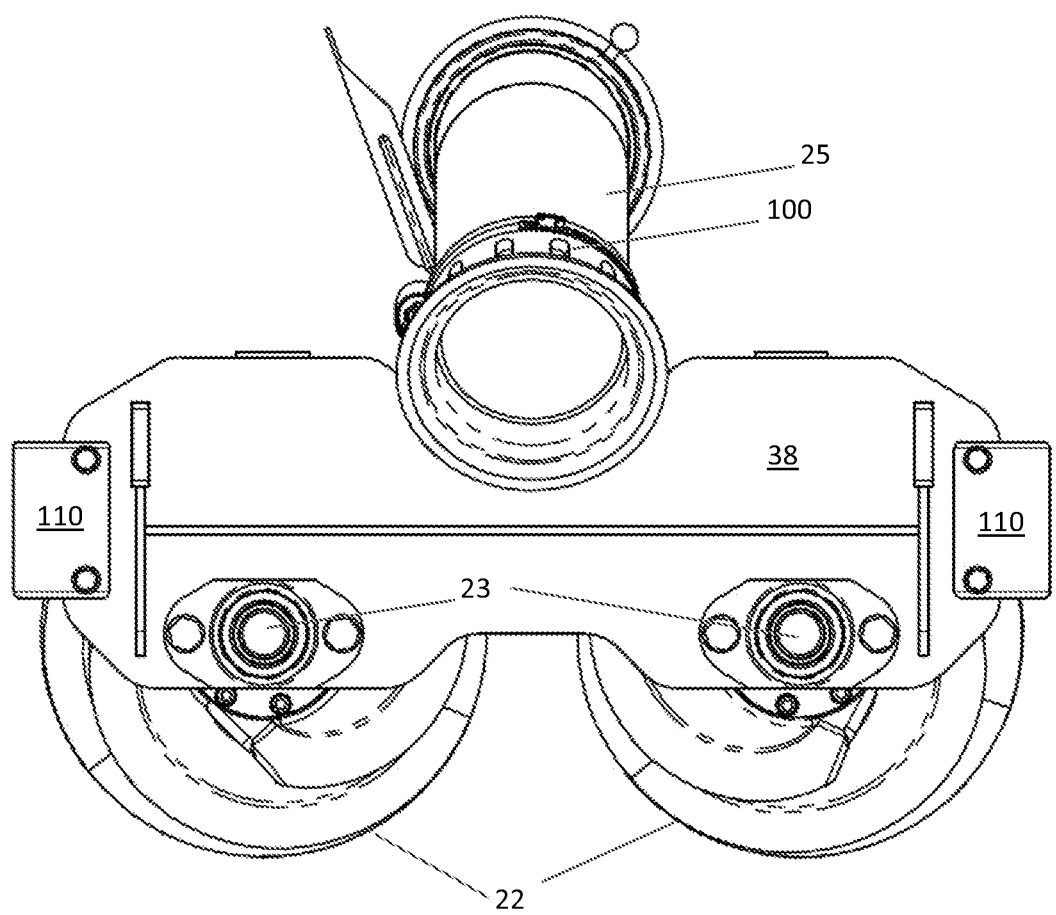
Figure 14:
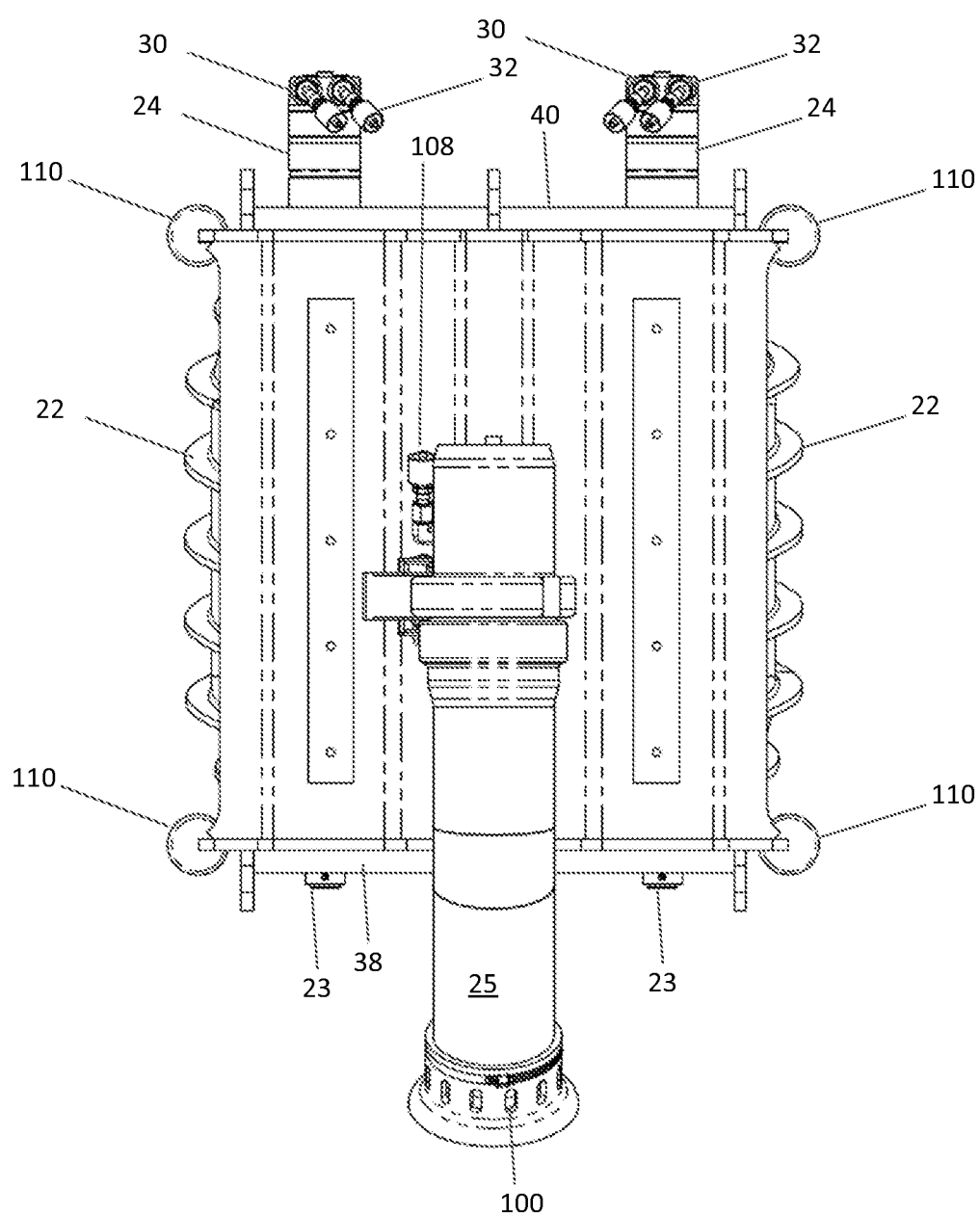
Figure 15:
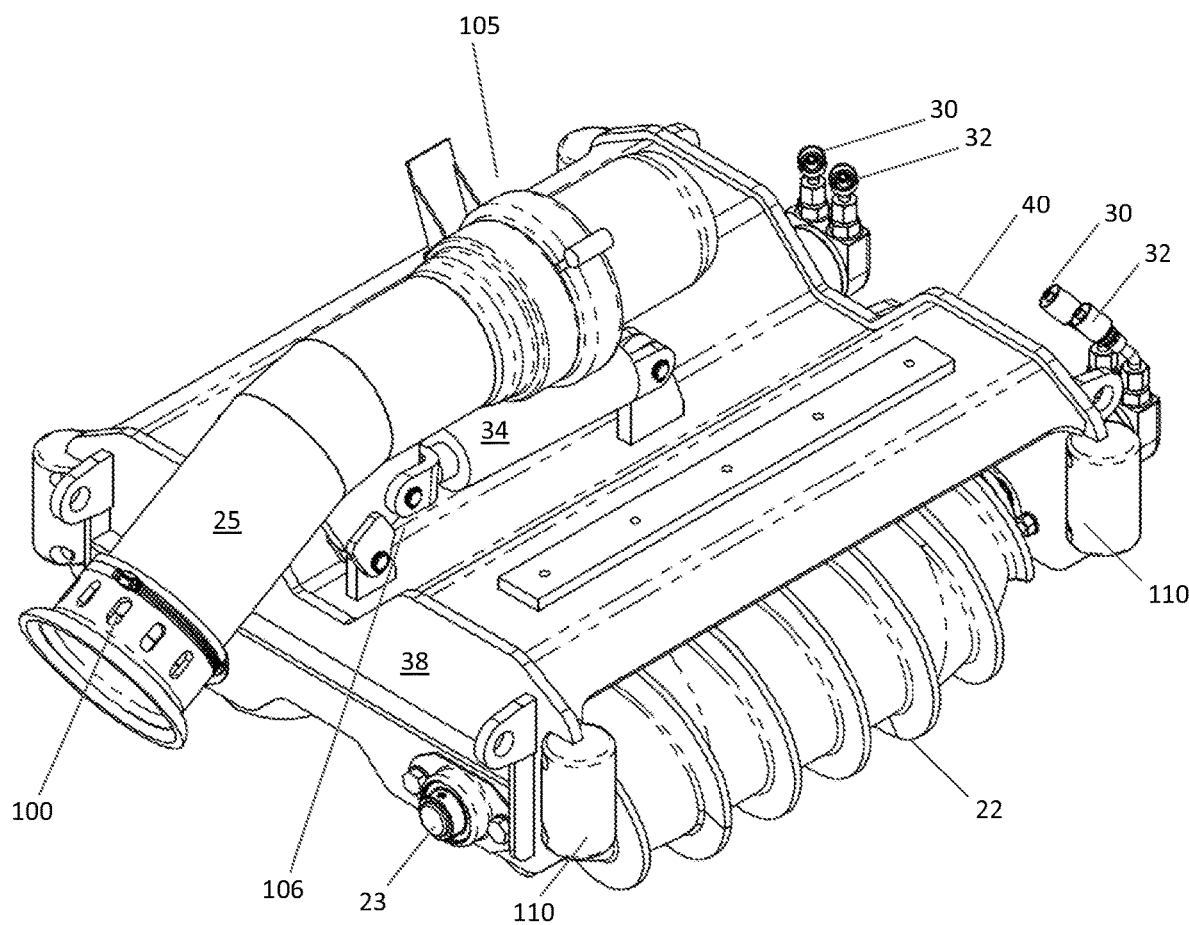

Referring still to FIGS. 12-15, a hydraulically actuated mechanism 34 for controlling a position of the vacuum head 25 is shown. The mechanism 34 may be connected to the vacuum head via one or more connections 106, which may be fixed or rotatable. A position of the mechanism 34 may be controlled hydraulically, for example, via hydraulic port 108. As illustrated in FIG. 12, mechanism 34 is extended and positioned the vacuum head vertically, such as to withdraw solids located proximate the screws 22 or from a top of the solids surface. As illustrated in FIG. 15, for example, mechanism 34 is retracted and positioned the vacuum head horizontally, such as to enable the solids removal device to fit through the vessel manway or to withdraw solids from a side of a vessel or from a high spot detected by one or more sensors.

The solids removal device may also include one or more bumpers or rollers 110 attached to the frame structure. Such bumpers, for example, may be made of softer material than the vessel, aiding in prevention of scarring or other damage to the inside of the vessel by contact with the solids removal device. The bumpers 110 may be positioned, for example, to prevent contact of the screws 22 with an inside of the vessel.

Referring now to FIGS. 16-20, other embodiments of a solids removal device are illustrated. Like reference numerals are used for like parts, consistent with the embodiments illustrated in FIGS. 4-10, including: solids removal device 14; hydraulic connections; screws 22; mechanism 34; and vacuum head 25, among other similar features not specifically labeled.

Figure 16:
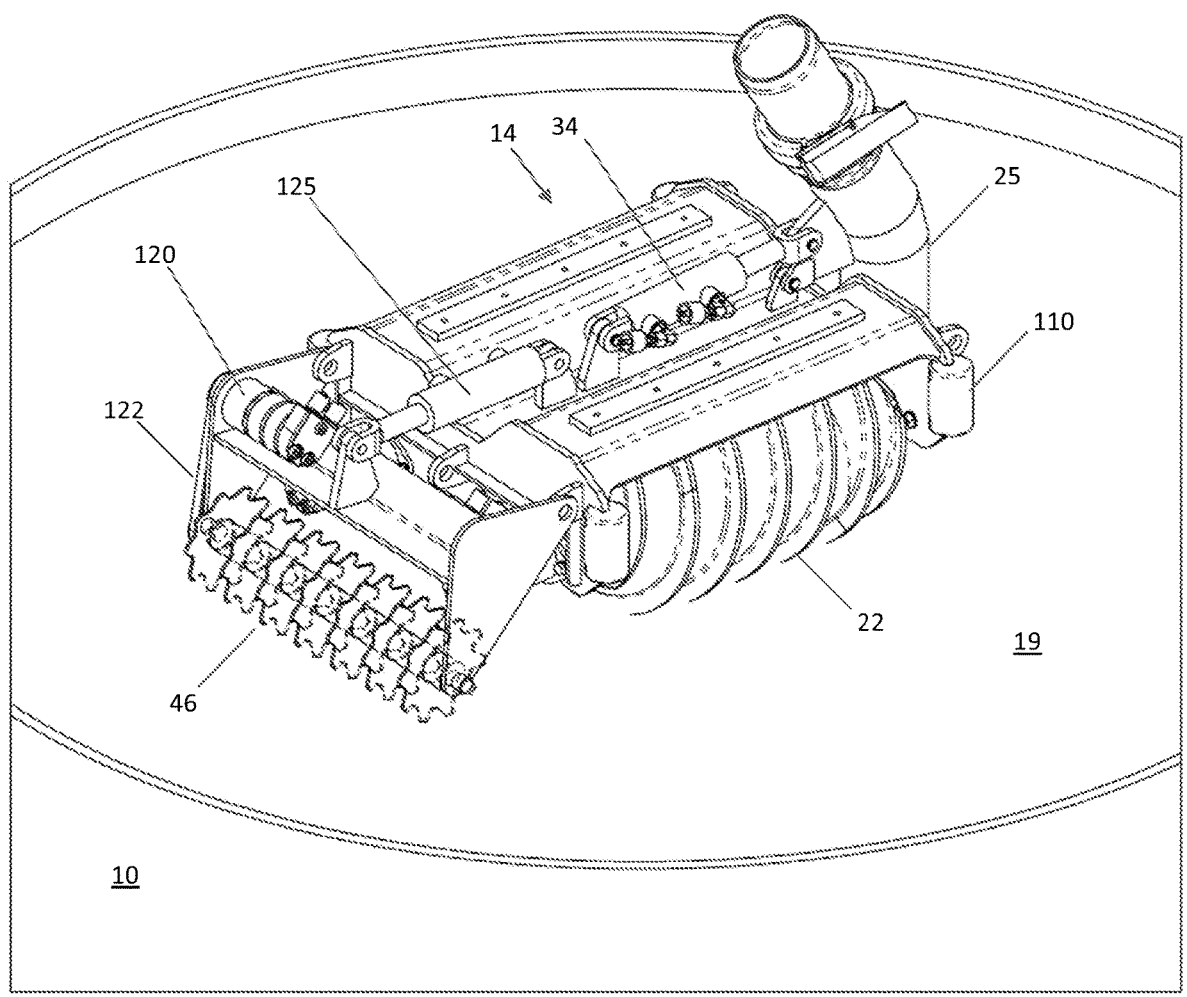
Figure 17:
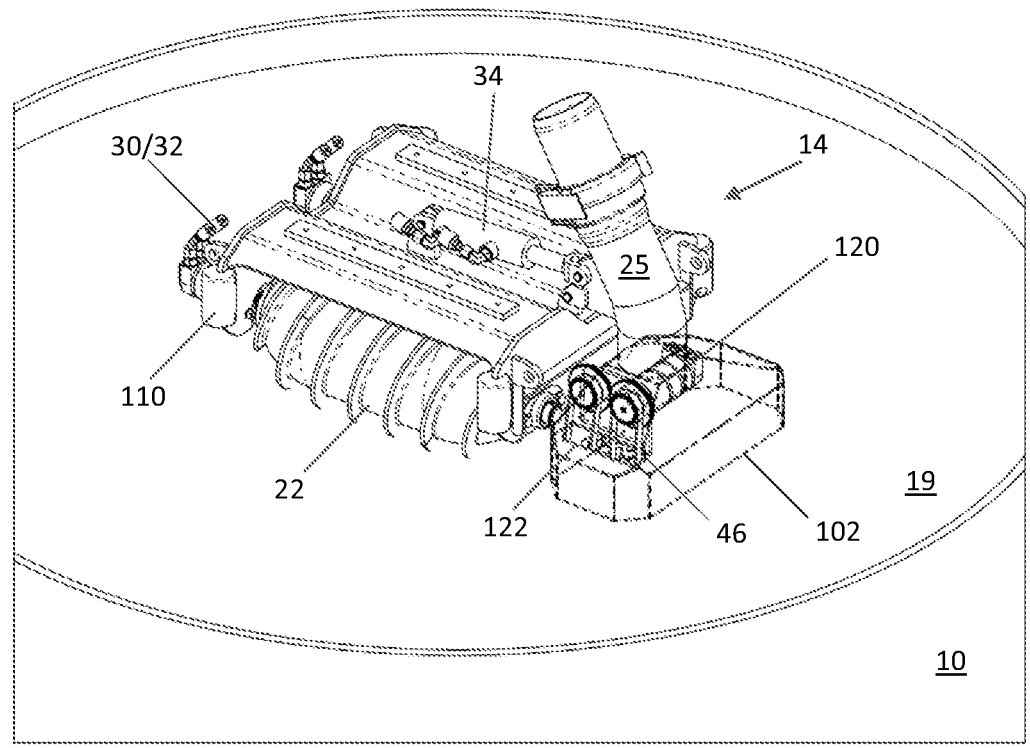
Figure 18:
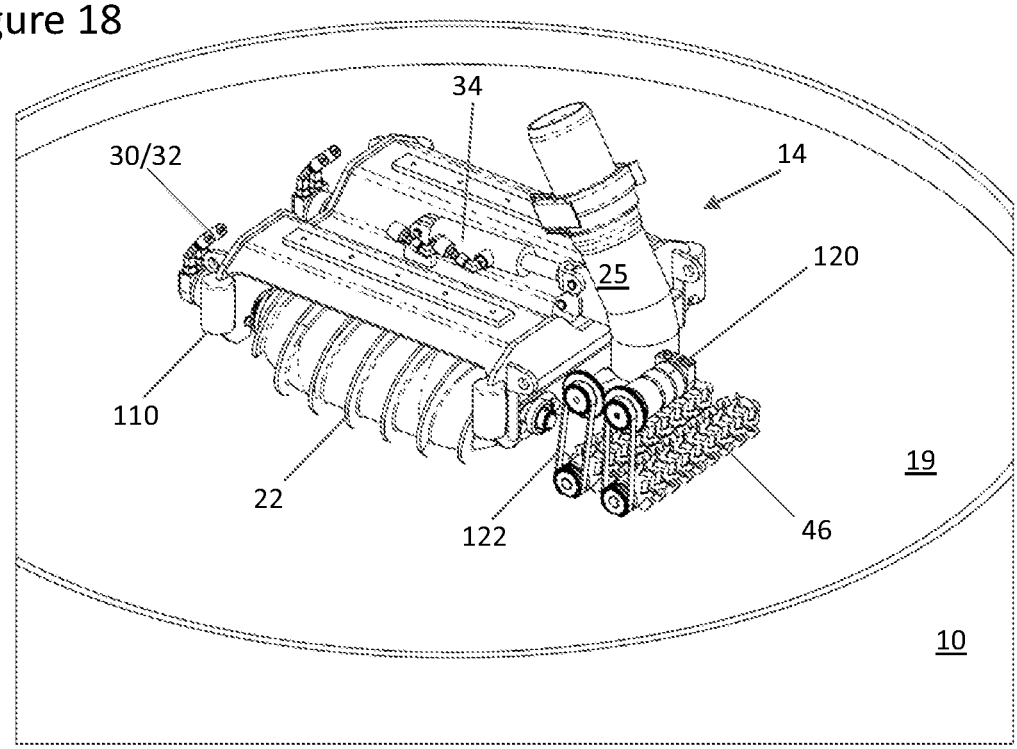
Figure 19:
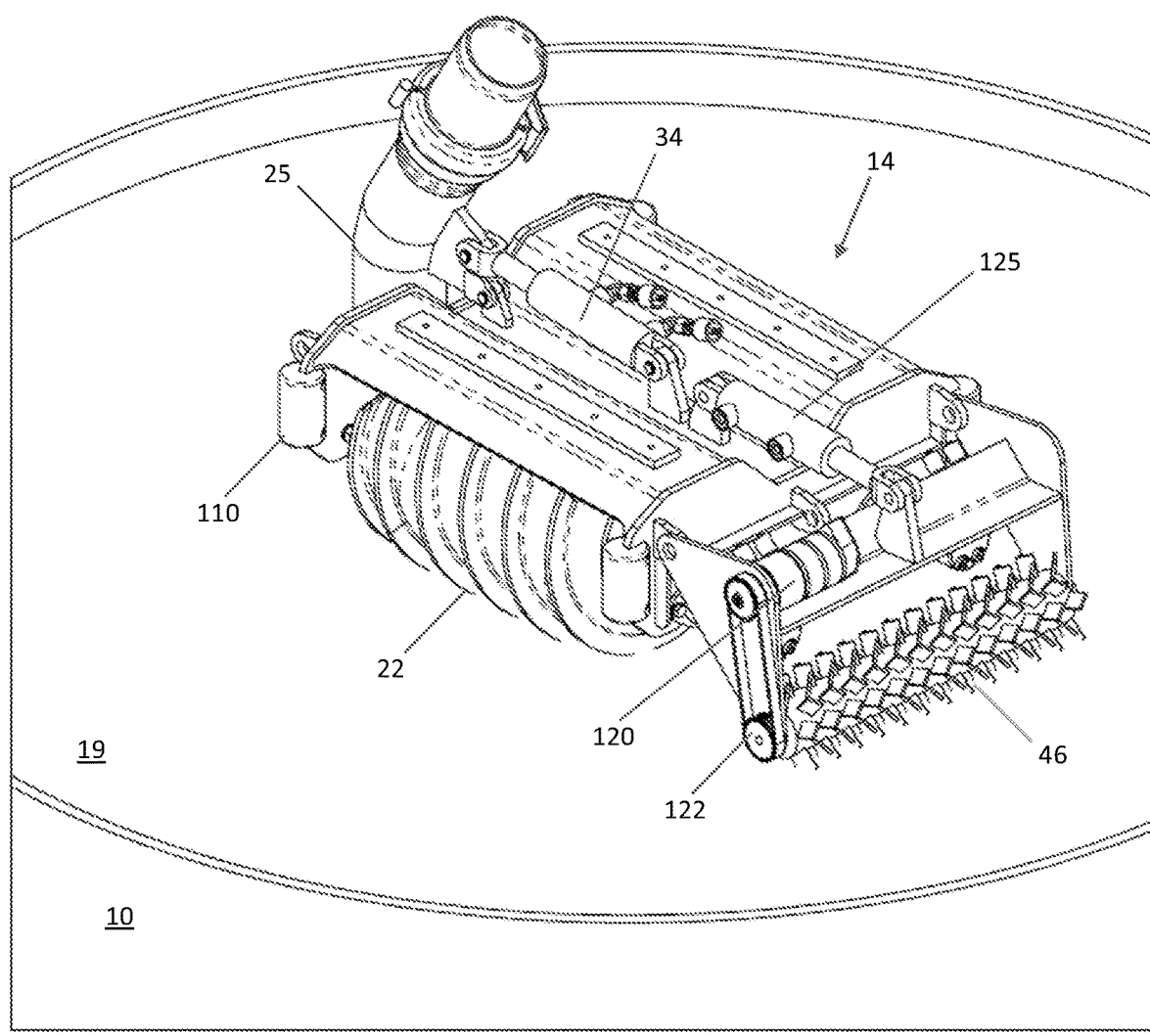
Figure 20:
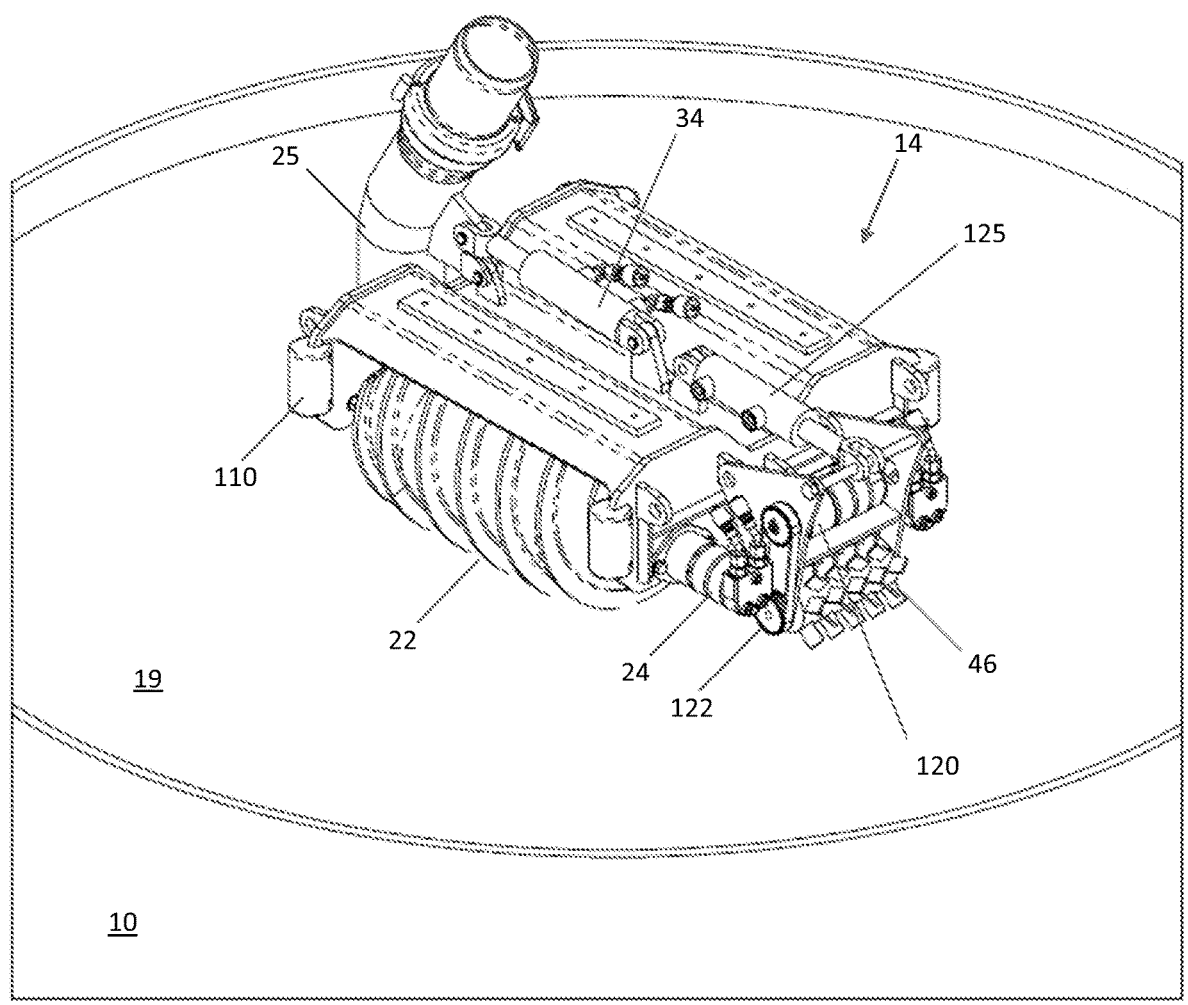

As illustrated in FIGS. 16-20, the solids removal device 14, in various embodiments, may include a breaking device 46, such as a disc harrow (FIG. 16), a paddle type breaking device (FIGS. 18-20). In some embodiments, the breaking device 46 may be incorporated into or proximate suction head 25 (FIGS. 17 and 18), or may be separate (FIGS. 16 and 19-20). Other breaking devices envisioned may include a chipping gun or a hydraulic/pneumatic splitter and drill (drill a hole, inject high pressure air).

Additionally, in various embodiments, the breaking devices 46 may be operated via a motor 120, which may control a pulley 122 or worm drive to rotate or operate the breaking device. In some embodiments, a position of the breaking device may be controlled, for example, being raised and lowered by a hydraulic cylinder 125 or other mechanisms to raise, lower, angle, or otherwise position the breaking device proximate an agglomeration of solids requiring breakage so as to effectively remove them from the vessel.

Figure 21:
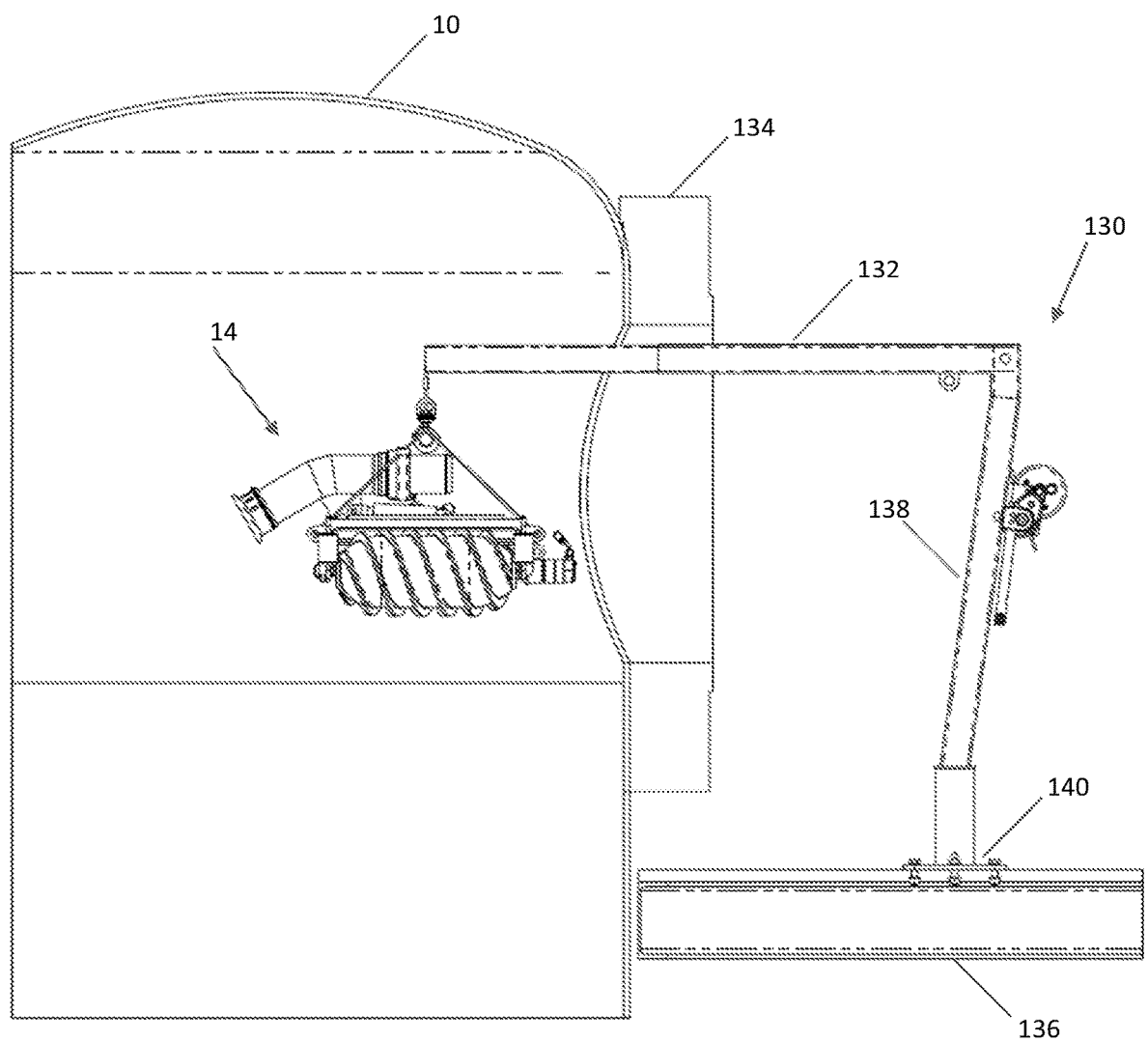

Many vessels do not have top manway entries or large flanges on the top of the vessel allowing a solids removal device to be lowered into a vessel. In other systems, a vessel may include a top trayed section and a lower solids-containing section, such as a multi-bed reactor, catalytic distillation column or other vessels including multiple beds or sections. In such embodiments, it may be necessary to place a solids removal device according to embodiments herein into the vessel via a manway or other access located on the side of a vessel. Referring now to FIG. 21, a jib 130 configured to allow side entry to a vessel 10 is illustrated. The jib may include an arm 132 that extends into a side manway 134 to enter and retract the device into and out of the vessel via a horizontal opening and still also raise and lower the device inside the vessel 10, and potentially to also support a weight of the vacuum hose. The base 136 of jib 130 may be configured to attach to a platform (not illustrated) proximate the manway 134, or may be provided with bolts or other means (not illustrated) for connecting to the manway flange and supporting the weight of the jib 130 and solids removal device 14. To facilitate movement of the solids removal device 14 through the manway 134, a position of the horizontal arm 132 may be adjustable, or alternatively or additionally, a position of the vertical arm 138 may be adjustable, such as via a slidable plate 140 connecting the vertical arm 138 to base 136.

Figure 22:
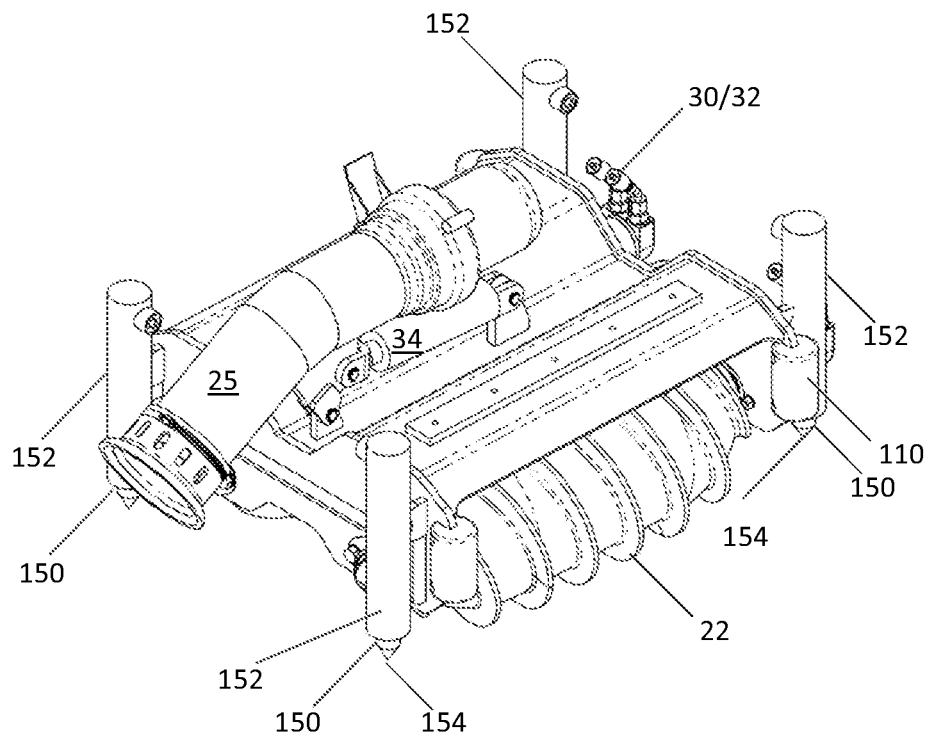
Figure 23:
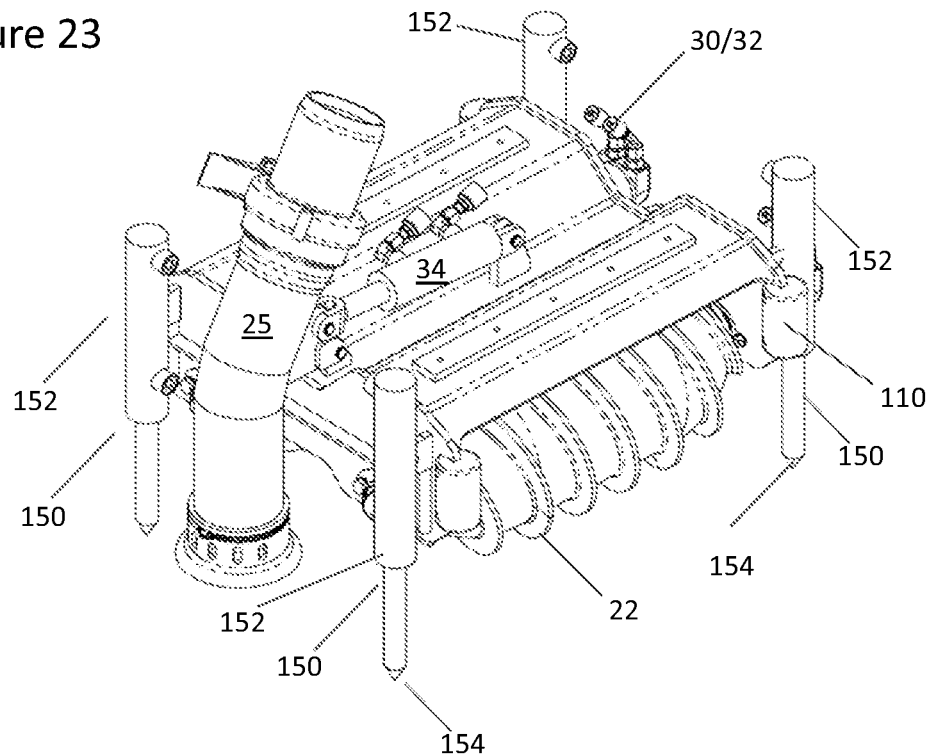

Referring now to FIGS. 22 and 23, embodiments of the solids removal device may include one or more hydraulic or pneumatic operated extension devices. The extension devices may include a piston 150 within a cylinder 152. The ends 154 of the piston may be flat, footed, or, as illustrated, may be pointed so as to penetrate the solids bed. The extension devices may serve multiple purposes, such as raising or lowering the solids removal device, such as to properly position the vacuum head or a breaking device within the vessel, as well as to provide stability when breaking, or to rapidly extend downward to perform additional breaking, if needed. When used to perform additional breaking, the extension devices may be operated up and down in a rapid manner to chip away at the agglomerated material. The extension devices may also be configured for high torque and operated slowly to burrow into a piece of agglomerated material.

Embodiments disclosed herein offer several important advantages, and embodiments herein may include one or more of the following. The device may be adaptable to a range of different vessel configurations, sizes and types including but not limited to single bed reactors, dyers or guard beds, multiple bed reactors, radial flow reactors and spherical reactors. The device sits on the catalyst surface and does not require specific flanged connections to the manway. The device supports its weight on the catalyst and does not require arms that extent to the reactor walls for stabilization which could cause damage to the reactor walls, scallops, ceramic lining or cladding. The device moves around using screws thereby avoiding any tracks or wheels that could break or get jammed. The screws also assist in breaking up slightly agglomerated catalyst. The device may have an adjustable vacuum head which will allow for consistent optimization of the gas to catalyst ratio in vacuum hose which will increase efficiency and reduce reactor downtime. Further, catalyst material is normally loose and vacuums freely; On occasion, catalyst can be slightly fused in which case various additional components can be attached to the device to break up the catalyst. The device can operate on steep angles, such as the angle of repose for the material. In the unlikely event that the solids removal device does flip over, it can be rectified by lifting it up via the jib and returning it to the catalyst surface. The device may be constructed with materials that have a high design temperature, which allows for unloading of the material before the vessel has cooled down.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A device for removing loose adsorbents or catalyst from a vessel, the device comprising:
    a frame structure comprising:
        a first end member and a second end member;
        one or more frame members connecting the first end member to the second end member;
    a first motor and a second motor, each connected to one of the first end member and the second end member;
    a first rotatable screw connected at a first end to the frame structure via an end bearing and operably connected at a second end to the first motor;
    a second rotatable screw connected at a first end to the frame structure via an end bearing and operably connected at a second end to the second motor;
    a vacuum head connected to the frame structure on or proximate the first end member, the vacuum head having a suction end and a discharge end connectable to a vacuum hose; and
    a counterweight disposed on the frame structure on or proximate the second end member, wherein the counterweight counterbalances the weight disposed on or proximate the first end member.

2. The device of claim 1, wherein the first end member and second end member are plates.

3. The device of claim 1, wherein at least one of the one or more frame members is expandable and contractible to selectively vary a distance between the first end member and the second end member.

4. The device of claim 1, wherein the first rotatable screw and the second rotatable screw are configured to rotate in opposite directions when both are providing forward propulsion.

5. The device of claim 1, wherein the first and second end members comprise multiple connection points or adjustable connection points such that the frame structure is connectable to first and second rotatable screws of different diameter.

6. The device of claim 1, wherein a position of the counterweight is adjustable.

7. The device of claim 6, wherein a position of the counterweight is remotely adjustable.

8. The device of claim 1, further comprising a camera mounted directly or indirectly to the frame structure.

9. The device of claim 1, further comprising a light connected directly or indirectly to the frame structure.

10. The device of claim 1, further comprising a sensor or detector mounted directly or indirectly to the frame structure.

11. The device of claim 1, further comprising one or more bumpers directly or indirectly coupled to the frame structure.

12. The device of claim 1, wherein a position of the vacuum head is adjustable via a mechanical linkage connecting the vacuum head to the frame structure.

13. The device of claim 12, wherein a position of the vacuum head is remotely adjustable.

14. The device of claim 1, wherein the discharge end and the suction end of the vacuum head are detachable.

15. The device of claim 1, further comprising a breaking device directly or indirectly coupled to the frame structure.

16. The device of claim 15, further comprising a third motor for rotating or driving the breaking device.

17. The device of claim 15, wherein the breaking device includes one or more of:
- a breaking device coupled to the second end member;
- a breaking device coupled to the first end member; or
- a breaking device coupled to or integral with the vacuum head.

18. The device of claim 15, wherein the breaking device comprises ripper teeth, sheep foot rollers, paddles, crushers, or a nitrogen jet.

19. The device of claim 1, wherein the first and second motors are pneumatic motors, the motors further comprising an exhaust system configured to discharge gas proximate the suction end of the vacuum head.

20. The device of claim 1, further comprising means for adjusting a suction through the vacuum head.

21. The device of claim 1, wherein a position of the vacuum head is adjustable via a hydraulic cylinder connecting the vacuum head to the frame structure.

22. The device of claim 21, wherein a position of the vacuum head is remotely adjustable.

23. The device of claim 15, wherein the breaking device comprises a disc harrow, a worm drive, a chipping gun, or a hydraulic/pneumatic splitter and drill.

24. The device of claim 18, wherein the breaking device is raised and lowered by a hydraulic cylinder.

25. The device of claim 23, wherein the breaking device is raised and lowered by a hydraulic cylinder.

26. The device of claim 1, wherein each of the first and second motors is independently operable such that the first and second rotatable screw are independently rotatable clockwise or counterclockwise to provide propulsion and turning capability.

27. A system for removing loose adsorbents or catalyst from a vessel, the system comprising:
- a device according to claim 1;
- a vacuum unit connected to the discharge end of the vacuum head via the vacuum hose; and
- a power unit coupled to the device.

28. The system of claim 27, further comprising a jib configured to attach to the vessel, raise and lower the device into and out of the vessel, and to support a weight of the vacuum hose.

29. The system of claim 27, further comprising a jib configured to attach to the vessel access platform, with an arm that extends into a side manway to enter and retract the device into and out of the vessel via a horizontal opening and still also raise and lower the device inside the vessel, and capable to also support a weight of the vacuum hose.

30. The system of claim 28, further comprising an adjustable base plate to connect the jib to different manway configurations.

31. The system of claim 28, further comprising a control unit configured to control operation of the device.

32. The system of claim 27, further comprising a control station for remotely operating the device.

33. A method of removing loose adsorbents or catalyst from a vessel, the method comprising:
- locating a system according to claim 27 proximate the vessel;
- disposing the device within the vessel; and
- removing loose solids from the vessel by operating the device, the vacuum unit, and the power unit.

* * * * *